US012122031B2

(12) United States Patent
Eba et al.

(10) Patent No.: US 12,122,031 B2
(45) Date of Patent: Oct. 22, 2024

(54) ELECTRIC WORK MACHINE

(71) Applicant: MAKITA CORPORATION, Anjo (JP)

(72) Inventors: Yukiko Eba, Anjo (JP); Yuta Araki, Anjo (JP)

(73) Assignee: MAKITA CORPORATION, Anjo (JP)

(*) Notice: Subject to any disclaimer, the term of this patent is extended or adjusted under 35 U.S.C. 154(b) by 106 days.

(21) Appl. No.: 17/952,510

(22) Filed: Sep. 26, 2022

(65) Prior Publication Data

US 2023/0158657 A1 May 25, 2023

(30) Foreign Application Priority Data

Nov. 24, 2021 (JP) ................................ 2021-189994

(51) Int. Cl.
*B25F 5/00* (2006.01)
*B25B 21/00* (2006.01)

(52) U.S. Cl.
CPC .............. *B25F 5/001* (2013.01); *B25B 21/00* (2013.01)

(58) Field of Classification Search
CPC ....................................................... B25F 5/001
See application file for complete search history.

(56) References Cited

U.S. PATENT DOCUMENTS

2022/0281095 A1* 9/2022 Abbott .................... B23B 31/36

FOREIGN PATENT DOCUMENTS

JP 2014-168840 A 9/2014

* cited by examiner

*Primary Examiner* — Daniel Jeremy Leeds
(74) *Attorney, Agent, or Firm* — Oliff PLC

(57) ABSTRACT

An electric work machine reduces damage to its components under a greater load on a spindle. An electric work machine includes a motor, a planetary gear assembly rotatable with a rotational force from the motor and including a carrier having a hole having an inner surface including two carrier flat surfaces, a spindle including a rear portion received in the hole and having an outer surface including two spindle flat surfaces, and a spindle locking assembly that transmits a rotational force in one direction from the carrier to the spindle and including a lock cam surrounding the spindle frontward from a front surface of the carrier and rotatable together with the spindle, a lock ring surrounding the lock cam, and a plurality of cylindrical members between the lock cam and the lock ring.

17 Claims, 17 Drawing Sheets

ELECTRIC WORK MACHINE

CROSS-REFERENCE TO RELATED APPLICATIONS

This application claims the benefit of priority to Japanese Patent Application No. 2021-189994, filed on Nov. 24, 2021, the entire contents of which are hereby incorporated by reference.

BACKGROUND

1. Technical Field

The present disclosure relates to an electric work machine.

2. Description of the Background

In the technical field of electric work machines, power tools with a spindle locking assembly are known, as one example is described in Japanese Unexamined Patent Application Publication No. 2014-168840.

BRIEF SUMMARY

In an electric work machine, a rotational force from a motor may be transmitted to a spindle through a planetary gear assembly. For example, as greater torque is applied to the spindle in a screwing operation, a greater load is applied onto the planetary gear assembly or onto a spindle locking assembly. This may at least partially damage the planetary gear assembly or the spindle locking assembly.

One or more aspects of the present disclosure are directed to reducing damage to components of an electric work machine under a greater load on a spindle.

A first aspect of the present disclosure provides an electric work machine, including:

- a motor;
- a planetary gear assembly at least partially located frontward from the motor, rotatable with a rotational force from the motor, and including a carrier, the carrier having a hole having an inner surface including two carrier flat surfaces;
- a spindle at least partially located frontward from the planetary gear assembly and including a rear portion received in the hole, the rear portion having an outer surface including two spindle flat surfaces, each of the two spindle flat surfaces being configured to come in contact with a corresponding carrier flat surface of the two carrier flat surfaces; and
- a spindle locking assembly configured to transmit a rotational force in one direction from the carrier to the spindle, the spindle locking assembly including
  - a lock cam surrounding the spindle frontward from a front surface of the carrier and rotatable together with the spindle,
  - a lock ring surrounding the lock cam, and
  - a plurality of cylindrical members between the lock cam and the lock ring.

A second aspect of the present disclosure provides an electric work machine, including:

- a motor;
- a planetary gear assembly at least partially located frontward from the motor, rotatable with a rotational force from the motor, and including a carrier, the carrier having a hole having an inner surface including a plurality of carrier flat surfaces;
- a spindle at least partially located frontward from the planetary gear assembly and including a rear portion received in the hole, the rear portion having an outer surface including a plurality of spindle flat surfaces, each of the plurality of spindle flat surfaces being configured to come in contact with a corresponding carrier flat surface of the plurality of carrier flat surfaces; and
- a spindle locking assembly configured to transmit a rotational force in one direction from the carrier to the spindle, the spindle locking assembly including
  - a lock cam surrounding the spindle frontward from a front surface of the carrier and rotatable together with the spindle,
  - a lock ring surrounding the lock cam, and
  - two cylindrical members between the lock cam and the lock ring.

The electric work machine according to the above aspects of the present disclosure reduces damage to its components under a greater load on the spindle.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of an electric work machine.

The electric work machine includes a motor. In the embodiments, a direction parallel to a rotation axis AX of the motor is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

In the embodiments, the rotation axis AX extends in the front-rear direction. The axial direction corresponds to the front-rear direction. The axial direction is from the front to the rear or from the rear to the front. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

Overview of Driver Drill

The electric work machine according to the embodiment is a driver drill, which is an example of a screwing work machine.

Figure 1:
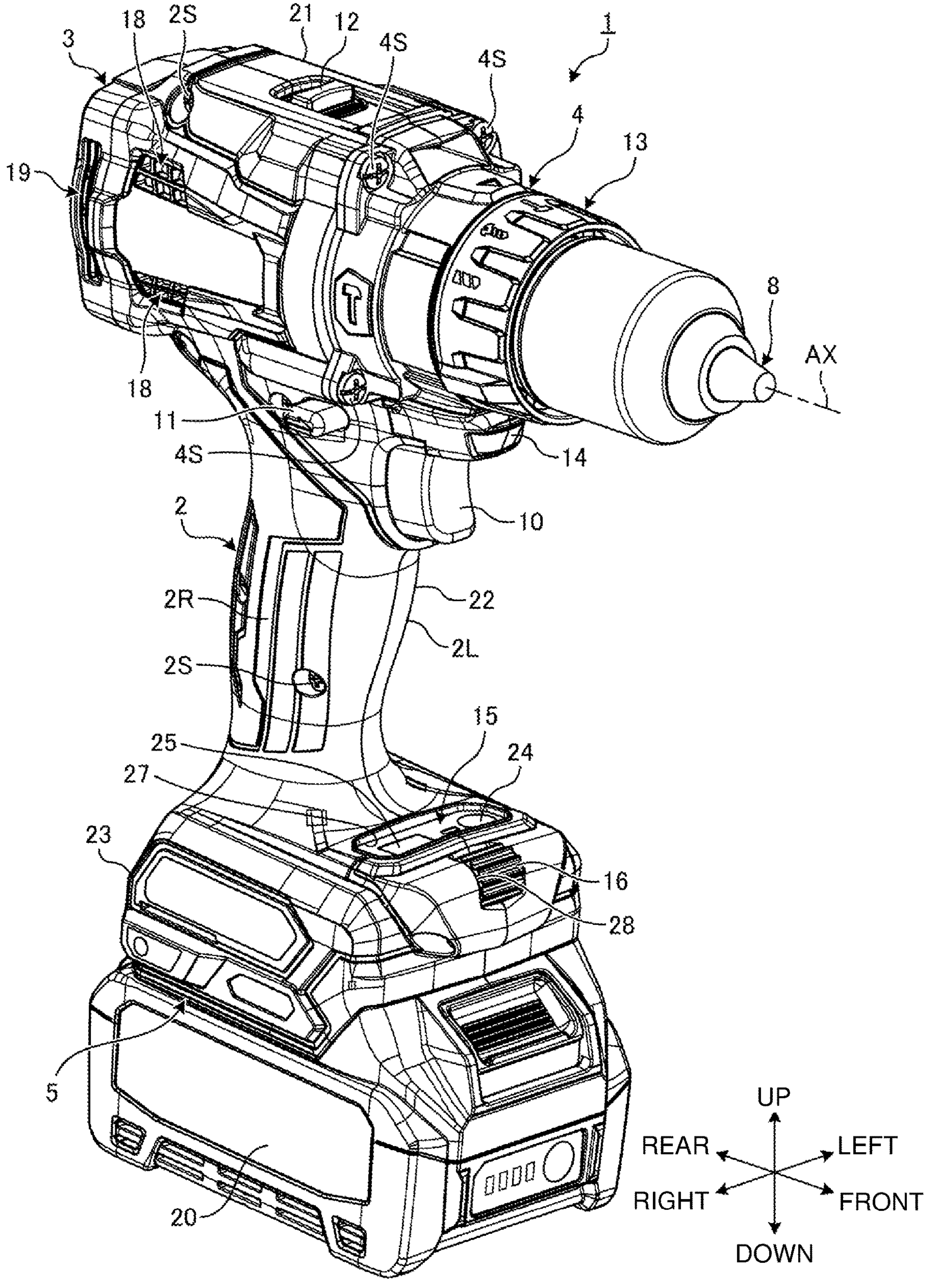
FIG. 1 is a front perspective view of a driver drill according to an embodiment.
Figure 2:
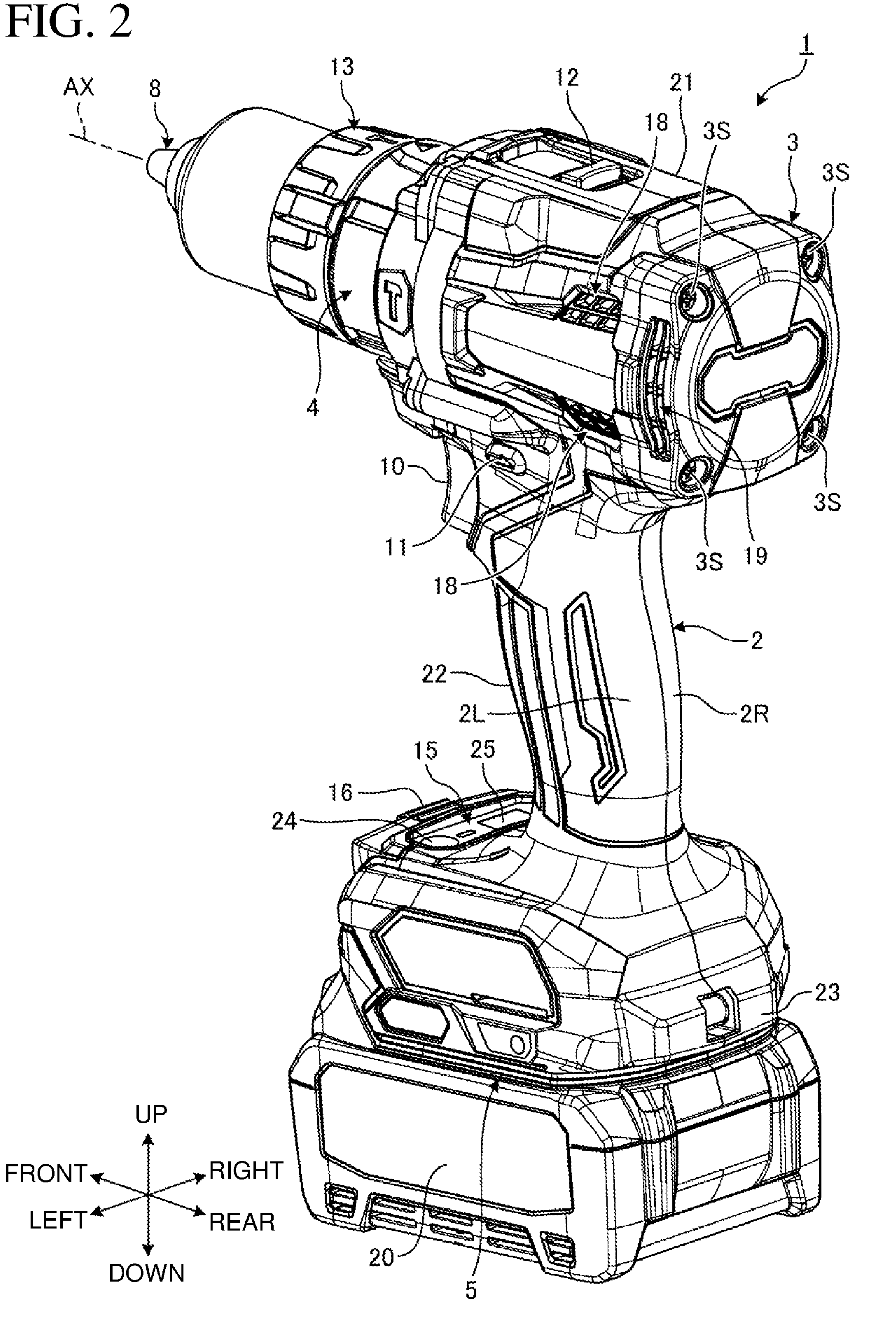
FIG. 2 is a rear perspective view of the driver drill according to the embodiment.
Figure 3:
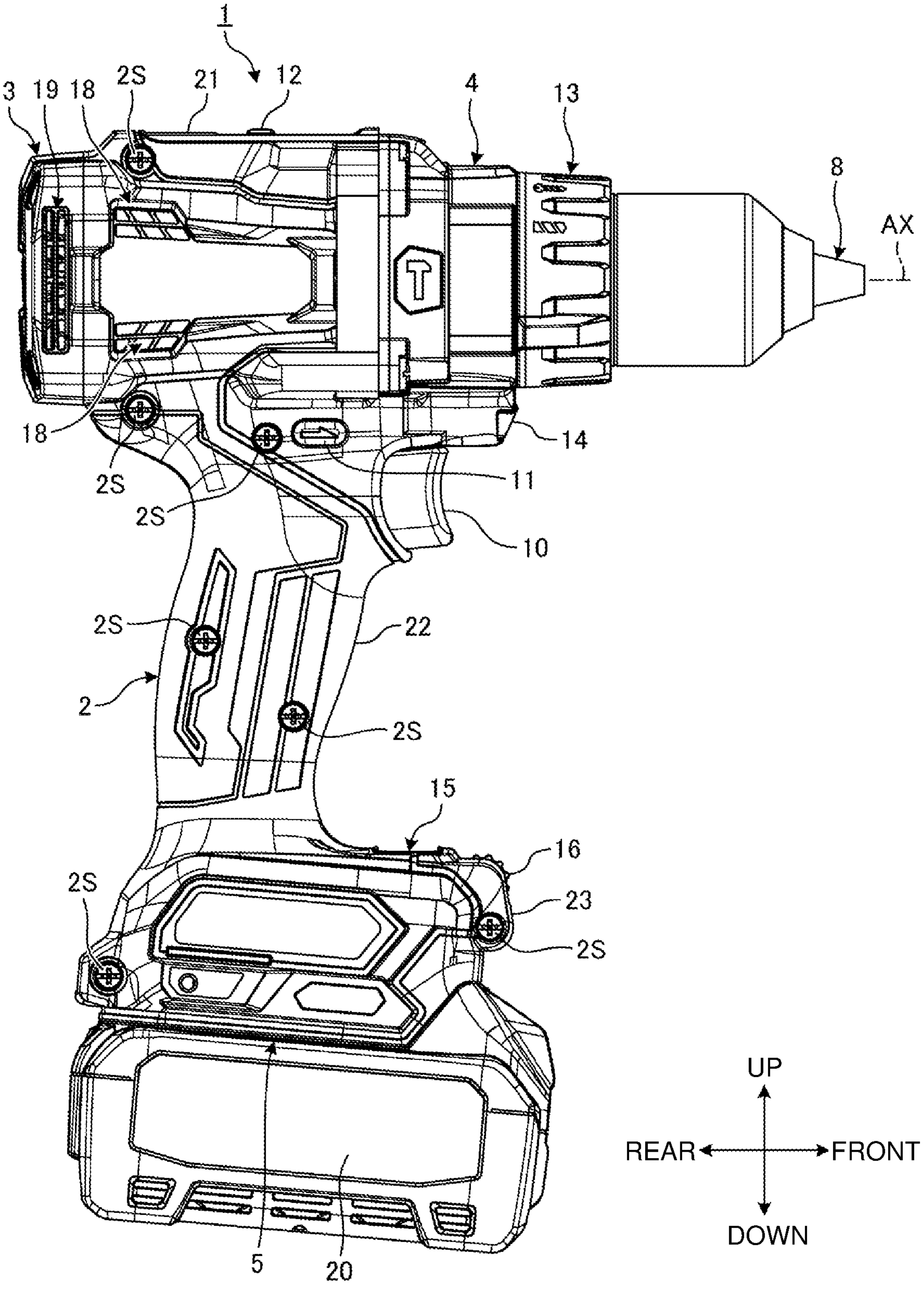
FIG. 3 is a side view of the driver drill according to the embodiment.
Figure 4:
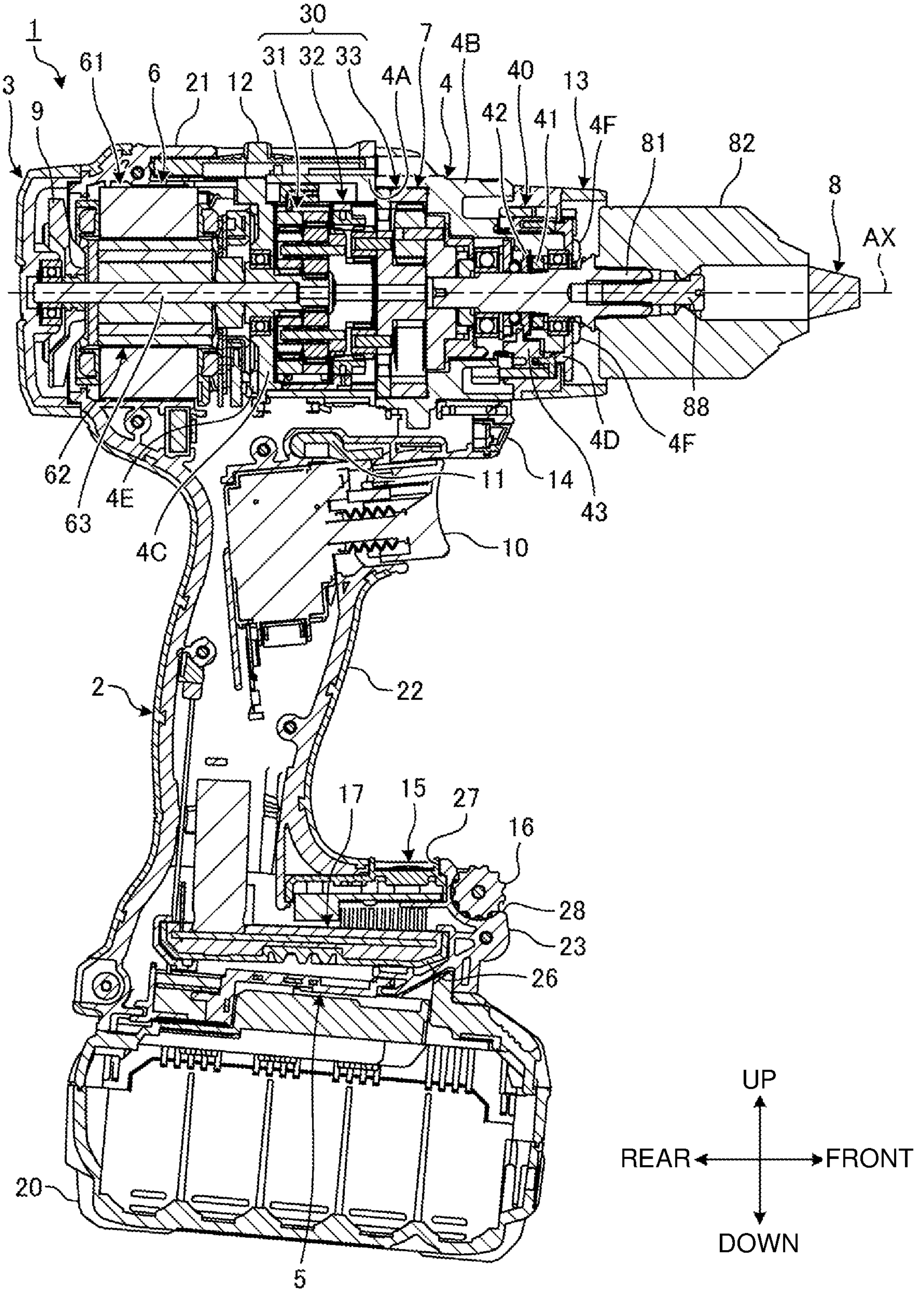
FIG. 4 is a sectional view of the driver drill according to the embodiment.

FIG. 1 is a front perspective view of a driver drill 1 according to the embodiment. FIG. 2 is a rear perspective view of the driver drill 1 according to the embodiment. FIG. 3 is a side view of the driver drill 1 according to the embodiment. FIG. 4 is a sectional view of the driver drill 1 according to the embodiment. The driver drill 1 according to the embodiment is a vibration driver drill.

As shown in FIGS. 1 to 4, the driver drill 1 includes a housing 2, a rear cover 3, a casing 4, a battery mount 5, a motor 6, a power transmission 7, an output unit 8, a fan 9, a trigger lever 10, a forward-reverse switch lever 11, a speed switch lever 12, a mode switch ring 13, a lamp 14, an interface panel 15, a dial 16, and a controller 17.

The housing 2 is formed from a synthetic resin. The housing 2 in the embodiment is formed from nylon. The housing 2 includes a left housing 2L and a right housing 2R. The left housing 2L and the right housing 2R are fastened together with screws 2S, thus forming the housing 2.

The housing 2 includes a motor compartment 21, a grip 22, and a battery holder 23.

The motor compartment 21 accommodates the motor 6. The motor compartment 21 is cylindrical.

The grip 22 is grippable by an operator. The grip 22 is located below the motor compartment 21. The grip 22 extends downward from the motor compartment 21. The trigger lever 10 is located in a front portion of the grip 22.

The battery holder 23 accommodates the controller 17. The battery holder 23 is located under the grip 22. The battery holder 23 is connected to a lower end of the grip 22. The battery holder 23 has larger outer dimensions than the grip 22 in the front-rear and lateral directions.

The rear cover 3 is formed from a synthetic resin. The rear cover 3 is located behind the motor compartment 21. The rear cover 3 accommodates the fan 9. The rear cover 3 covers a rear opening of the motor compartment 21. The rear cover 3 is fastened to the motor compartment 21 with screws 3S.

The motor compartment 21 has inlets 18. The rear cover 3 has outlets 19. Air outside the housing 2 flows into an internal space of the housing 2 through the inlets 18. Air in the internal space of the housing 2 flows out of the housing 2 through the outlets 19.

The casing 4 accommodates the power transmission 7. The casing 4 includes a first casing 4A, a second casing 4B, a bracket plate 4C, and a stop plate 4D. The second casing 4B is located in front of the first casing 4A. The mode switch ring 13 is located in front of the second casing 4B. The first casing 4A is formed from a synthetic resin. The second casing 4B is formed from a metal. The second casing 4B in the embodiment is formed from aluminum. The casing 4 is located in front of the motor compartment 21. The first casing 4A and the second casing 4B are cylindrical.

The first casing 4A is fixed to the rear end of the second casing 4B. The bracket plate 4C covers the opening at the rear end of the first casing 4A. The bracket plate 4C is fastened to the rear end of the first casing 4A with screws 4E. The stop plate 4D covers the opening at the front end of the second casing 4B. The stop plate 4D is fastened to the front end of the second casing 4B with screws 4F.

The casing 4 covers the front opening of the motor compartment 21. The first casing 4A is located inside the motor compartment 21. The second casing 4B is fastened to the motor compartment 21 with screws 4S.

The battery mount 5 is located under the battery holder 23. The battery mount 5 is connected to a battery pack 20. The battery pack 20 is detachable from the battery mount 5. The battery pack 20 includes a secondary battery. The battery pack 20 in the embodiment includes a rechargeable lithium-ion battery. The battery pack 20 is attached to the battery mount 5 to power the driver drill 1. The motor 6 is driven by power supplied from the battery pack 20. The interface panel 15 and the controller 17 operate on power supplied from the battery pack 20.

The motor 6 powers the driver drill 1. The motor 6 is a brushless inner-rotor motor. The motor 6 is accommodated in the motor compartment 21. The motor 6 includes a cylindrical stator 61 and a rotor 62. The rotor 62 is located inside the stator 61. The rotor 62 includes a rotor shaft 63 extending in the axial direction.

The power transmission 7 is located in front of the motor 6. The power transmission 7 is accommodated in the casing 4. The power transmission 7 connects the rotor shaft 63 and the output unit 8 together. The power transmission 7 transmits power generated by the motor 6 to the output unit 8. The power transmission 7 includes multiple gears.

The power transmission 7 includes a reducer 30 and a vibrator 40.

The reducer 30 reduces rotation of the rotor shaft 63 and rotates the output unit 8 at a lower rotational speed than the rotor shaft 63. The reducer 30 in the embodiment includes a first planetary gear assembly 31, a second planetary gear assembly 32, and a third planetary gear assembly 33. The first planetary gear assembly 31 is at least partially located frontward from the motor 6. The second planetary gear assembly 32 is located frontward from the first planetary gear assembly 31. The third planetary gear assembly 33 is located frontward from the second planetary gear assembly 32. Each of the first to third planetary gear assemblies 31 to 33 rotates with a rotational force from the motor 6.

The vibrator 40 vibrates the output unit 8 in the axial direction. The vibrator 40 includes a first cam 41, a second cam 42, and a vibration switch ring 43.

The output unit 8 is located frontward from the motor 6. The output unit 8 rotates with a rotational force from the motor 6. The output unit 8 holding a tip tool rotates with a rotational force transmitted from the motor 6 through the power transmission 7. The output unit 8 includes a spindle 81 and a chuck 82. The spindle 81 rotates about the rotation axis AX with a rotational force transmitted from the motor 6. The tip tool is attached to the chuck 82. The spindle 81 is located at least partially frontward from the third planetary gear assembly 33.

The fan 9 is located behind the motor 6. The fan 9 generates an airflow for cooling the motor 6. The fan 9 is fixed to at least a part of the rotor 62. The fan 9 is fixed to a rear portion of the rotor shaft 63. As the rotor shaft 63 rotates, the fan 9 rotates together with the rotor shaft 63. Thus, air outside the housing 2 flows into the internal space of the housing 2 through the inlets 18. Air flowing into the internal space of the housing 2 flows through the internal space of the housing 2 and thus cools the motor 6. The air then flows out of the housing 2 through the outlets 19.

The trigger lever 10 activates the motor 6. The trigger lever 10 is located in an upper portion of the grip 22. The trigger lever 10 has a front end protruding frontward from the front portion of the grip 22. The trigger lever 10 is movable in the front-rear direction. The trigger lever 10 is operable by the operator. The trigger lever 10 is operated to move backward to activate the motor 6. When the trigger lever 10 is released from being operated, the motor 6 is stopped.

The forward-reverse switch lever 11 is operable to change the rotation direction of the motor 6. The forward-reverse switch lever 11 is located in the upper portion of the grip 22. The forward-reverse switch lever 11 has a left end protruding leftward from a left portion of the grip 22. The forward-reverse switch lever 11 has a right end protruding rightward from a right portion of the grip 22. The forward-reverse switch lever 11 is movable in the lateral direction. The forward-reverse switch lever 11 is operable by the operator. The forward-reverse switch lever 11 moves leftward to rotate the motor 6 forward. The forward-reverse switch lever 11 moves rightward to rotate the motor 6 reversely. Switching the rotation direction of the motor 6 switches the rotation direction of the spindle 81.

The speed switch lever 12 is operable to change the speed mode of the reducer 30. The speed switch lever 12 is located in an upper portion of the motor compartment 21. The speed switch lever 12 is movable in the front-rear direction. The speed switch lever 12 is operable by the operator. The speed mode of the reducer 30 includes a low-speed mode, a medium-speed mode, and a high-speed mode. In the low-speed mode, the output unit 8 rotates at a low speed. In the medium-speed mode, the output unit 8 rotates at a medium speed. In the high-speed mode, the output unit 8 rotates at a high speed. The movable range of the speed switch lever 12 is defined in the front-rear direction. The speed switch lever 12 moves forward in its movable range to set the reducer 30 to the low-speed mode. The speed switch lever 12 moves to the middle in its movable range to set the reducer 30 to the medium-speed mode. The speed switch lever 12 moves backward in its movable range to set the reducer 30 to the high-speed mode.

The mode switch ring 13 is operable to change the operation mode of the vibrator 40. The mode switch ring 13 is located in front of the casing 4. The mode switch ring 13 is rotatable. The mode switch ring 13 is operable by the operator. The operation mode of the vibrator 40 includes a vibration mode and a non-vibration mode. In the vibration mode, the output unit 8 vibrates in the axial direction. In the non-vibration mode, the output unit 8 does not vibrate in the axial direction. The mode switch ring 13 at a vibration mode position in the rotation direction sets the vibrator 40 to the vibration mode. The mode switch ring 13 at a non-vibration mode position in the rotation direction sets the vibrator 40 to the non-vibration mode.

The lamp 14 emits illumination light to illuminate ahead of the driver drill 1. The lamp 14 includes, for example, a light-emitting diode (LED). The lamp 14 is located under a front portion of the motor compartment 21. The lamp 14 is located above the trigger lever 10.

The interface panel 15 is located on the battery holder 23. The interface panel 15 includes an operation unit 24 and a display 25. The interface panel 15 is a plate. The operation unit 24 includes an operation button. The display 25 is, for example, a segment display including multiple segment light emitters, a flat display panel such as a liquid crystal display, or an indicator display including multiple LEDs.

The battery holder 23 has a panel opening 27. The panel opening 27 is formed in an upper surface of the battery holder 23 and frontward from the grip 22. The interface panel 15 is at least partially located in the panel opening 27.

The operation unit 24 is operable to change the drive mode of the motor 6. The operation unit 24 is operable by the operator. The motor 6 has a drill mode and a clutch mode as its drive mode. In the drill mode, the motor 6 is driven independently of the torque applied to the motor 6 in driving the motor 6. In the clutch mode, the motor 6 is stopped in response to torque exceeding a torque threshold being applied to the motor 6 in driving the motor 6.

The dial 16 is operable to change the drive conditions of the motor 6. The dial 16 is located in a front portion of the battery holder 23. The dial 16 is supported by the battery holder 23 in a rotatable manner. The dial 16 is rotatable by 360° or greater. The dial 16 is operable by the operator. The drive conditions of the motor 6 include the torque threshold. The dial 16 is operable to change the torque threshold in the clutch mode set by the operation unit 24.

The battery holder 23 has a dial opening 28. The dial opening 28 is formed in a front right portion of the battery holder 23. The dial 16 is at least partially received in the dial opening 28.

The controller 17 includes a computer system. The controller 17 outputs a control command for controlling the motor 6. The controller 17 is at least partially accommodated in a controller case 26. The controller 17 is held by the controller case 26 and is accommodated in the battery holder 23. The controller 17 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a transistor, a capacitor, and a resistor.

The controller 17 sets the drive conditions of the motor 6 based on an operation on the dial 16. The drive conditions of the motor 6 include the torque threshold. In the clutch mode, the controller 17 sets a torque threshold based on the operation on the dial 16.

In the clutch mode, the controller 17 stops the motor 6 in response to torque exceeding the set torque threshold being applied to the motor 6 in driving the motor 6.

The controller 17 displays the set drive conditions of the motor 6 on the display 25. The controller 17 displays the set torque threshold on the display 25.

Motor and Power Transmission

Figure 5:
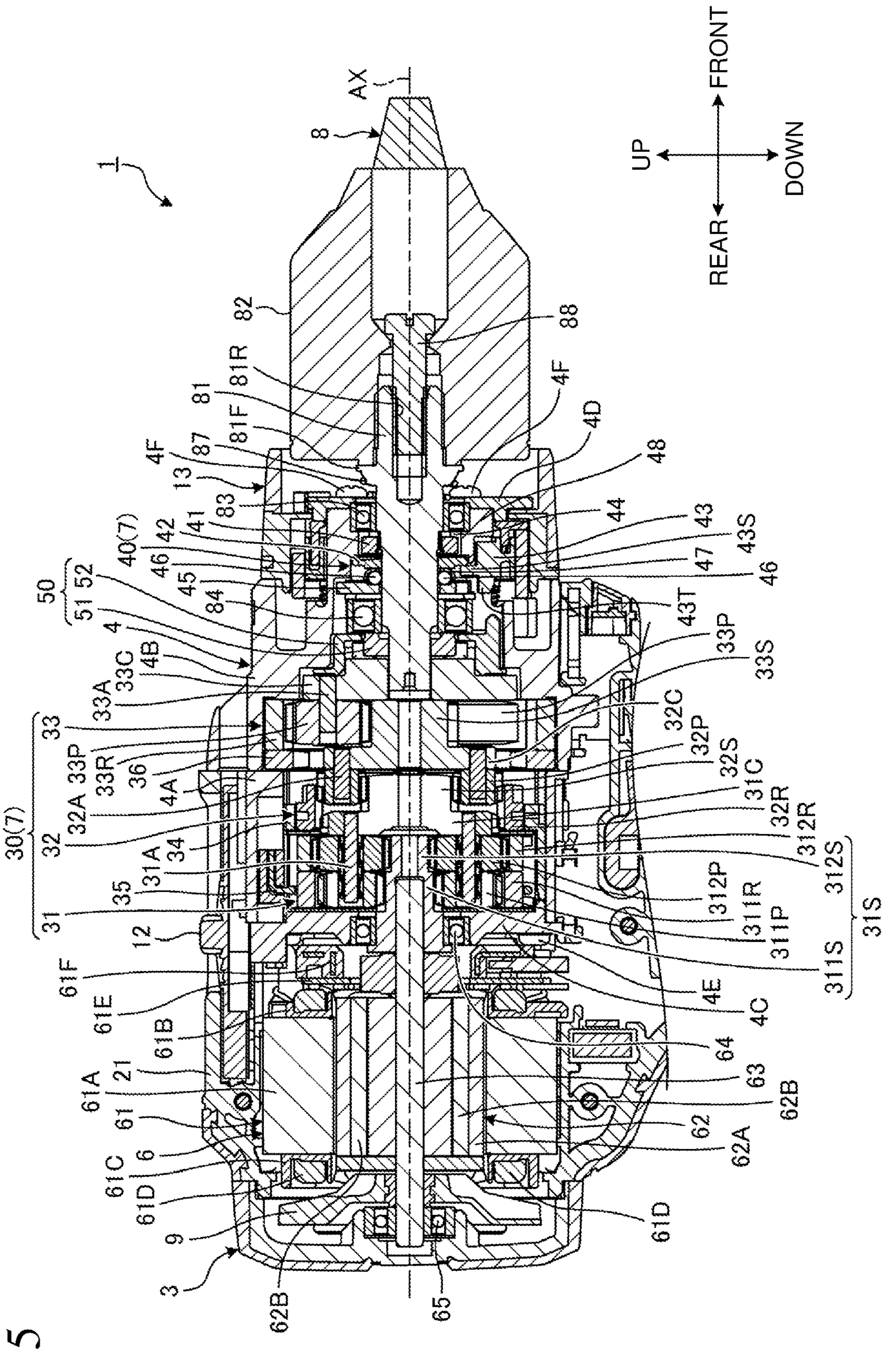
FIG. 5 is a partial sectional view of the driver drill according to the embodiment.

FIG. 5 is a partial sectional view of the driver drill 1 according to the embodiment. The motor 6 includes the cylindrical stator 61 and the rotor 62 as shown in FIG. 5. The rotor 62 is located inside the stator 61. The rotor 62 includes the rotor shaft 63 extending in the axial direction.

The stator 61 includes a stator core 61A, a front insulator 61B, a rear insulator 61C, multiple coils 61D, a sensor circuit board 61E, and a short-circuiting member 61F. The stator core 61A includes multiple steel plates stacked on one another. The front insulator 61B is located in front of the stator core 61A. The rear insulator 61C is located behind the stator core 61A. The coils 61D are wound around the stator core 61A with the front insulator 61B and the rear insulator 61C between them. The sensor circuit board 61E is attached to the front insulator 61B. The short-circuiting member 61F is supported by the front insulator 61B. The sensor circuit board 61E includes multiple rotation detectors to detect the rotation of the rotor 62. The short-circuiting member 61F connects multiple coils 61D with fusing terminals. The short-circuiting member 61F is connected to the controller 17 with lead wires.

The rotor 62 rotates about the rotation axis AX. The rotor 62 includes the rotor shaft 63, a rotor core 62A, and multiple permanent magnets 62B. The rotor core 62A surrounds the rotor shaft 63. The multiple permanent magnets 62B are held by the rotor core 62A. The rotor core 62A is cylindrical. The rotor core 62A includes multiple steel plates stacked on one another. The rotor core 62A has a through-hole extending in the axial direction. The rotor core 62A has multiple through-holes located circumferentially. The permanent magnets 62B are received in the respective through-holes in the rotor core 62A.

The rotation detector in the sensor circuit board 61E detects the magnetic fields of the permanent magnets 62B to detect the rotation of the rotor 62. The controller 17 provides a drive current to the coils 61D based on the detection data from the rotation detector.

The rotor shaft 63 rotates about the rotation axis AX. The rotation axis AX of the rotor shaft 63 is aligned with the rotation axis of the output unit 8. The rotor shaft 63 includes a front portion supported by a bearing 64 in a rotatable manner. The rotor shaft 63 includes a rear portion supported by a bearing 65 in a rotatable manner. The bearing 64 is held on the bracket plate 4C. The bracket plate 4C is located in front of the stator 61. The bearing 65 is held by the rear cover 3. The rotor shaft 63 has its front end located frontward from the bearing 64. The rotor shaft 63 has its front end located in an internal space of the casing 4.

A pinion gear 31S is located at the front end of the rotor shaft 63. The pinion gear 31S includes a larger-diameter portion 311S and a smaller-diameter portion 312S. The smaller-diameter portion 312S is located in front of the larger-diameter portion 311S. The rotor shaft 63 is connected to the first planetary gear assembly 31 in the reducer 30 with the pinion gear 31S.

The first planetary gear assembly 31 includes multiple planetary gears 311P, multiple planetary gears 312P, a first carrier 31C, an internal gear 311R, and an internal gear 312R.

The planetary gears 311P surround the larger-diameter portion 311S of the pinion gear 31S. The planetary gears 312P surround the smaller-diameter portion 312S of the pinion gear 31S. The first carrier 31C supports the planetary gears 311P and the planetary gears 312P. The internal gear 311R surrounds the planetary gears 311P. The internal gear 312R surrounds the planetary gears 312P. Each planetary gear 311P has a smaller outer diameter than the planetary gear 312P. A pin 31A is located on the first carrier 31C. The planetary gears 311P and the planetary gears 312P are supported by the pin 31A in a rotatable manner. The first carrier 31C supports the planetary gears 311P and the planetary gears 312P with the pin 31A in a rotatable manner. The first carrier 31C includes a gear on its outer periphery.

The second planetary gear assembly 32 includes a sun gear 32S, multiple planetary gears 32P, a second carrier 32C, and an internal gear 32R. The planetary gears 32P surround the sun gear 32S. The second carrier 32C supports the planetary gears 32P. The internal gear 32R surrounds the planetary gears 32P. The sun gear 32S is located in front of the first carrier 31C. The sun gear 32S has a smaller diameter than the first carrier 31C. The first carrier 31C is integral with the sun gear 32S. The first carrier 31C and the sun gear 32S rotate together. A pin 32A is located on the second carrier 32C. The planetary gears 32P are supported by the pin 32A in a rotatable manner. The second carrier 32C supports the planetary gears 32P with the pin 32A in a rotatable manner.

The third planetary gear assembly 33 includes a sun gear 33S, multiple planetary gears 33P, a third carrier 33C, and an internal gear 33R. The planetary gears 33P surround the sun gear 33S. The third carrier 33C supports the planetary gears 33P. The internal gear 33R surrounds the planetary gears 33P. The sun gear 33S is located in front of the second carrier 32C. The sun gear 33S has a smaller diameter than the second carrier 32C. The second carrier 32C is integral with the sun gear 33S. The second carrier 32C and the sun gear 33S rotate together. Pins 33A are located on the third carrier 33C. The planetary gears 33P are supported by the corresponding pins 33A in a rotatable manner. The third carrier 33C supports the planetary gears 33P with the corresponding pins 33A in a rotatable manner.

The reducer 30 includes a first speed switcher 34 and a second speed switcher 35. The first speed switcher 34 is connected to the speed switch lever 12. The second speed switcher 35 is connected to the speed switch lever 12.

The first speed switcher 34 switches between an enabled mode and a disabled mode. In the enabled mode, the rotation reduction of the second planetary gear assembly 32 is enabled. In the disabled mode, the rotation reduction of the second planetary gear assembly 32 is disabled. The second planetary gear assembly 32 being placed in the enabled mode includes the rotation of the internal gear 32R being restricted. The second planetary gear assembly 32 being placed in the disabled mode includes the rotation of the internal gear 32R being allowed. The rotation of the internal gear 32R is restricted to place the second planetary gear assembly 32 in the enabled mode. The rotation of the internal gear 32R is allowed to place the second planetary gear assembly 32 in the disabled mode.

The first speed switcher 34 is movable in the front-rear direction inside the first casing 4A. The first speed switcher 34 moves forward to place the second planetary gear assembly 32 in the enabled mode. The first speed switcher 34 moves backward to place the second planetary gear assembly 32 in the disabled mode. As the speed switch lever 12 moves in the front-rear direction, the first speed switcher 34 moves in the front-rear direction.

The internal gear 32R in the embodiment is connected to the first speed switcher 34. As the first speed switcher 34 moves in the front-rear direction, the internal gear 32R moves in the front-rear direction together with the first speed switcher 34. A cam ring 36 is located in front of the internal gear 32R. The cam ring 36 has cam teeth on its inner circumferential surface. The internal gear 32R has cam teeth on its outer circumferential surface.

As the first speed switcher 34 moves forward to place the internal gear 32R at least partially inside the cam ring 36, the cam teeth on the internal gear 32R and the cam teeth on the cam ring 36 mesh each other. This restricts the rotation of the internal gear 32R. As the first speed switcher 34 moves backward to remove the internal gear 32R from inside the cam ring 36, the cam teeth on the internal gear 32R and the cam teeth on the cam ring 36 separate from each other. This allows the rotation of the internal gear 32R.

When the second planetary gear assembly 32 is in the enabled mode, the internal gear 32R meshes with the planetary gears 32P alone. When the second planetary gear assembly 32 is in the disabled mode, the internal gear 32R meshes with both the planetary gears 32P and the first carrier 31C.

The second speed switcher 35 switches between the first reduction mode and the second reduction mode. In the first reduction mode, the rotation of the internal gear 312R in the first planetary gear assembly 31 is restricted, and the rotation in the internal gear 311R is allowed. In the second reduction mode, the rotation of the internal gear 311R in the first planetary gear assembly 31 is restricted, and the rotation of the internal gear 312R is allowed. The second speed switcher 35 is movable in the front-rear direction inside the first casing 4A. The second speed switcher 35 moves forward and enters the first reduction mode. The second speed switcher 35 moves backward and enters the second reduction mode. As the speed switch lever 12 moves in the front-rear direction, the second speed switcher 35 moves in the front-rear direction.

A cam pin (not shown in FIG. 5) is engaged with the second speed switcher 35. The cam pin moves in the front-rear direction together with the second speed switcher 35 while being guided along a guide groove on the first casing 4A. The cam pin is received in the guide groove and thus does not move in the circumferential direction.

When the second speed switcher 35 moves forward to surround the internal gear 312R, the cam pin comes in contact with the cam teeth on the outer circumference surface of the internal gear 312R. This restricts the rotation of the internal gear 312R. More specifically, the second speed switcher 35 moves forward to restrict the rotation of the internal gear 312R. This places the first planetary gear assembly 31 in the first reduction mode.

When the second speed switcher 35 moves backward to surround the internal gear 311R, the cam pin comes in contact with the cam teeth on the outer circumference surface of the internal gear 311R. This restricts the rotation of the internal gear 311R. More specifically, the second speed switcher 35 moves backward to restrict the rotation of internal gear 311R. This places the first planetary gear assembly 31 in the second reduction mode.

In the embodiment, the speed mode of the reducer 30 includes the low-speed mode, the medium-speed mode, and the high-speed mode. The speed switch lever 12 moves forward in its movable range to set the reducer 30 to the low-speed mode. The speed switch lever 12 moves to the middle in its movable range to set the reducer 30 to the medium-speed mode. The speed switch lever 12 moves backward in its movable range to set the reducer 30 to the high-speed mode.

The low-speed mode includes the first planetary gear assembly 31 being set to the first reduction mode and the second planetary gear assembly 32 being set to the enabled mode. The speed switch lever 12 moves forward in its movable range to set the first planetary gear assembly 31 to the first reduction mode, and set the second planetary gear assembly 32 to the enabled mode.

The medium-speed mode includes the first planetary gear assembly 31 being set to the first reduction mode and the second planetary gear assembly 32 being set to the disabled mode. The speed switch lever 12 moves to the middle in its movable range to set the first planetary gear assembly 31 to the first reduction mode, and set the second planetary gear assembly 32 to the disabled mode.

The medium-speed mode includes the first planetary gear assembly 31 being set to the second reduction mode and the second planetary gear assembly 32 being set to the disabled mode. The speed switch lever 12 moves forward in its movable range to set the first planetary gear assembly 31 to the second reduction mode, and set the second planetary gear assembly 32 to the disabled mode.

The spindle 81 is connected to the third carrier 33C with the spindle locking assembly 50. The spindle locking assembly 50 includes a lock cam 51 and a lock ring 52. The lock cam 51 surrounds the spindle 81. The lock ring 52 supports the lock cam 51 in a rotatable manner. The lock ring 52 is located inside the second casing 4B. The lock ring 52 is fixed to the second casing 4B. As the third carrier 33C rotates, the spindle 81 rotates.

The spindle 81 is supported by a bearing 83 and a bearing 84 in a rotatable manner. In this state, the spindle 81 is movable in the front-rear direction.

The spindle 81 includes a flange 81F. A coil spring 87 is located between the flange 81F and the bearing 83. The flange 81F comes in contact with the front end of the coil spring 87. The coil spring 87 generates an elastic force for moving the spindle 81 forward.

The chuck 82 can hold the tip tool. The chuck 82 is connected to a front portion of the spindle 81. The spindle 81 has a threaded hole 81R on its front end. The chuck 82 and the spindle 81 are fastened with a screw 88. With the head of the screw 88 in contact with the chuck 82, threads on the screw 88 are placed into the threaded hole 81R, thus connecting the chuck 82 and the spindle 81 together. The chuck 82 rotates as the spindle 81 rotates. The chuck 82 holding the tip tool rotates.

The first cam 41 and the second cam 42 in the vibrator 40 are both located inside the second casing 4B. The first cam 41 and the second cam 42 are located between the bearing 83 and the bearing 84 in the front-rear direction.

The first cam 41 is annular. The first cam 41 surrounds the spindle 81. The first cam 41 is fixed to the spindle 81. The first cam 41 rotates together with the spindle 81. The first cam 41 has cam teeth on its rear surface. The first cam 41 is supported by a stop ring 44. The stop ring 44 surrounds the spindle 81. The stop ring 44 is located between the first cam 41 and the bearing 83 in the front-rear direction. An elastic force from the coil spring 87 causes the stop ring 44 to come in contact with a rear surface of the bearing 83.

The second cam 42 is annular. The second cam 42 is located behind the first cam 41. The second cam 42 surrounds the spindle 81. The second cam 42 is rotatable relative to the spindle 81. The second cam 42 has cam teeth on its front surface. The cam teeth on the front surface of the second cam 42 mesh with the cam teeth on the rear surface of the first cam 41. The second cam 42 includes a tab on its rear surface.

A support ring 45 is located between the second cam 42 and the bearing 84 in the front-rear direction. The support ring 45 is located inside the second casing 4B. The support ring 45 is fixed to the second casing 4B. The support ring 45 receives multiple steel balls 46 on its front surface. A washer 47 is located between the steel ball 46 and the second cam 42. The second cam 42 is rotatable while being restricted from moving forward and backward in a space defined by the support ring 45 and the washer 47.

The vibration switch ring 43 switches between the vibration mode and the non-vibration mode. The mode switch ring 13 is connected to the vibration switch ring 43 with a cam ring 48 between them. The mode switch ring 13 is rotatable together with the cam ring 48. The vibration switch ring 43 is movable in the front-rear direction. The vibration switch ring 43 includes a protrusion 43T. The protrusion 43T is placed in a guide hole in the second casing 4B. The vibration switch ring 43 is movable in the front-rear direction while being guided along the guide hole in the second casing 4B. The protrusion 43T restricts the vibration switch ring 43 from rotating. The operator operates the mode switch ring 13 to move the vibration switch ring 43 in the front-rear direction. The vibration switch ring 43 moves in the front-rear direction between an advanced position and a retracted position rearward from the advanced position to switch between the vibration mode and the non-vibration mode. The mode switch ring 13 is operable to switch between the vibration mode and the non-vibration mode.

The vibration mode includes the state of the second cam 42 being restricted from rotating. The non-vibration mode includes the state of the second cam 42 being rotatable. When the vibration switch ring 43 moves to the advanced position, the second cam 42 is restricted from rotating. When the vibration switch ring 43 moves to the retracted position, the second cam 42 becomes rotatable.

In the vibration mode, the vibration switch ring 43 at the advanced position is at least partially in contact with the second cam 42. This restricts the second cam 42 from rotating. When the motor 6 is driven in this state, the first cam 41 fixed to the spindle 81 rotates in contact with the cam teeth on the second cam 42. The spindle 81 thus rotates while vibrating in the front-rear direction.

In the non-vibration mode, the vibration switch ring 43 at the retracted position is separate from the second cam 42. This allows the second cam 42 to rotate. When the motor 6 is driven in this state, the second cam 42 rotates together with the first cam 41 and the spindle 81. The spindle 81 thus rotates without vibrating in the front-rear direction.

The vibration switch ring 43 surrounds the first cam 41 and the second cam 42. The vibration switch ring 43 includes an opposing portion 43S facing the rear surface of the second cam 42. The opposing portion 43S protrudes radially inward from a rear portion of the vibration switch ring 43.

When the mode switch ring 13 is operated to move the vibration switch ring 43 to the advanced position, the tab on the rear surface of the second cam 42 is in contact with the opposing portion 43S of the vibration switch ring 43. This restricts the second cam 42 from rotating. In this manner, the mode switch ring 13 is operated to move the vibration switch ring 43 to the advanced position and to switch the vibrator 40 to the vibration mode.

When the mode switch ring 13 is operated to move the vibration switch ring 43 to the retracted position, the opposing portion 43S of the vibration switch ring 43 is separate from the second cam 42. This allows the second cam 42 to rotate. In this manner, the mode switch ring 13 is operated to move the vibration switch ring 43 to the retracted position and to switch the vibrator 40 to the non-vibration mode.

Spindle Locking Assembly

Figure 6:
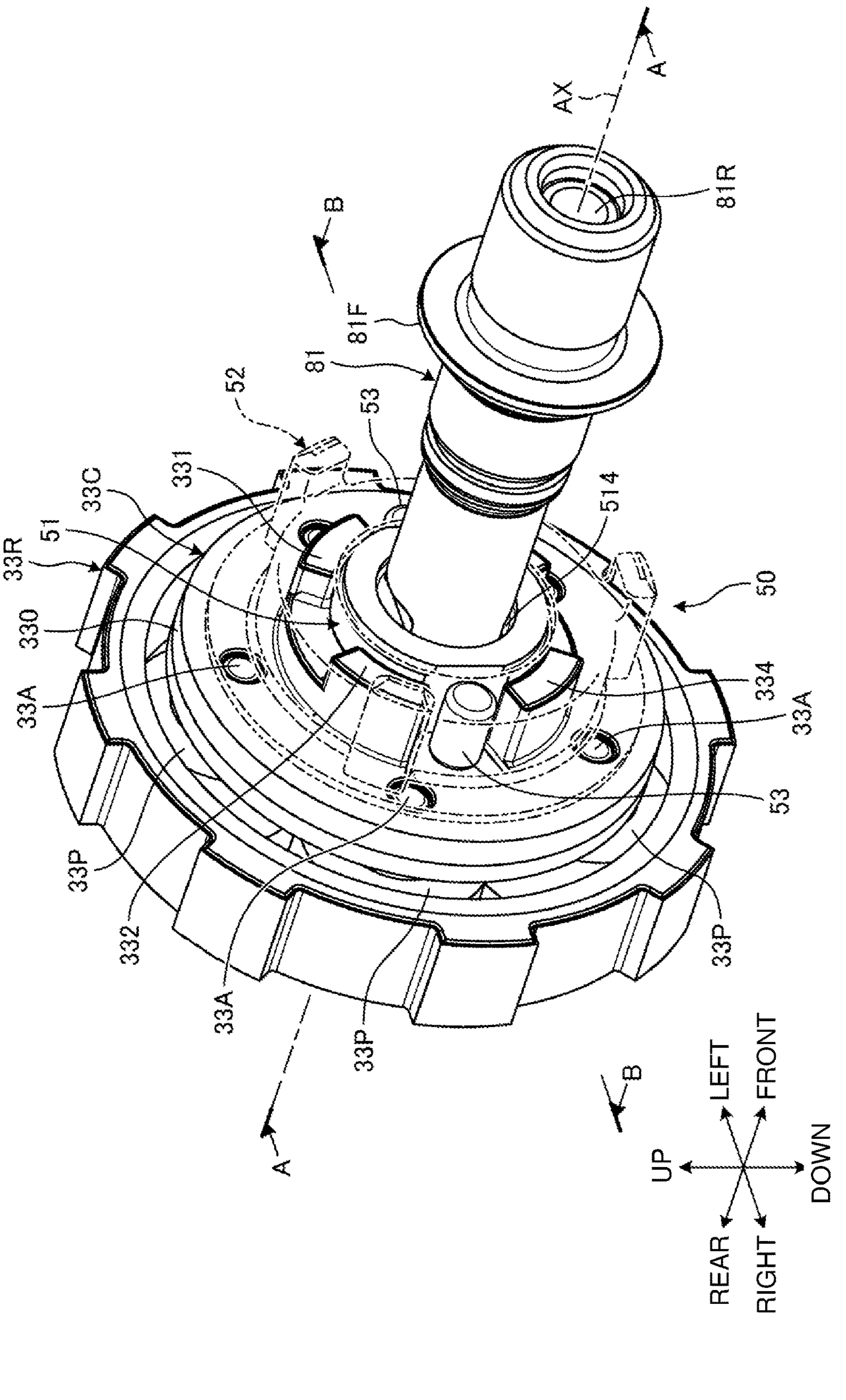
FIG. 6 is a front perspective view of a spindle locking assembly in the embodiment.
Figure 7:
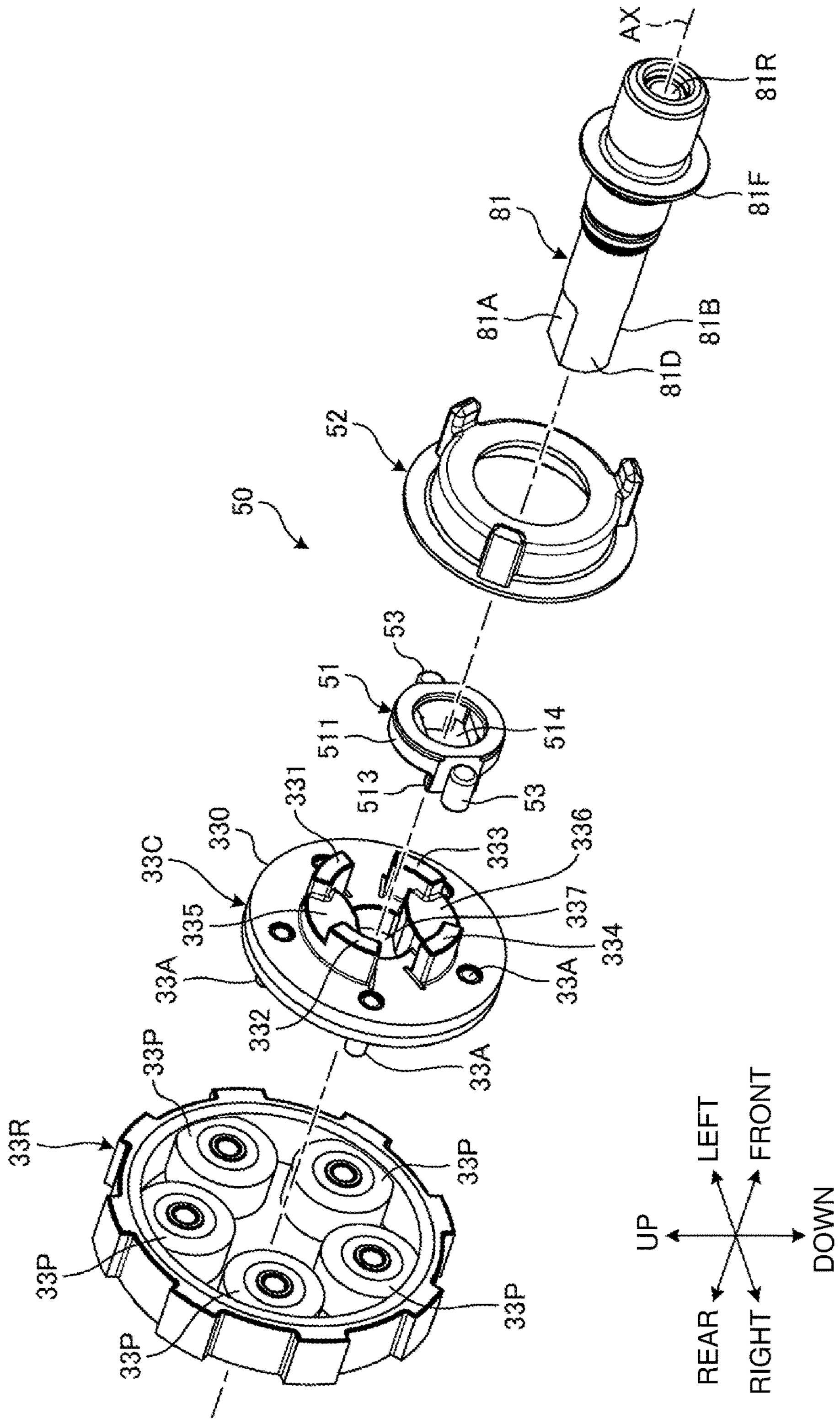
FIG. 7 is an exploded perspective view of the spindle locking assembly in the embodiment as viewed from the front.
Figure 8:
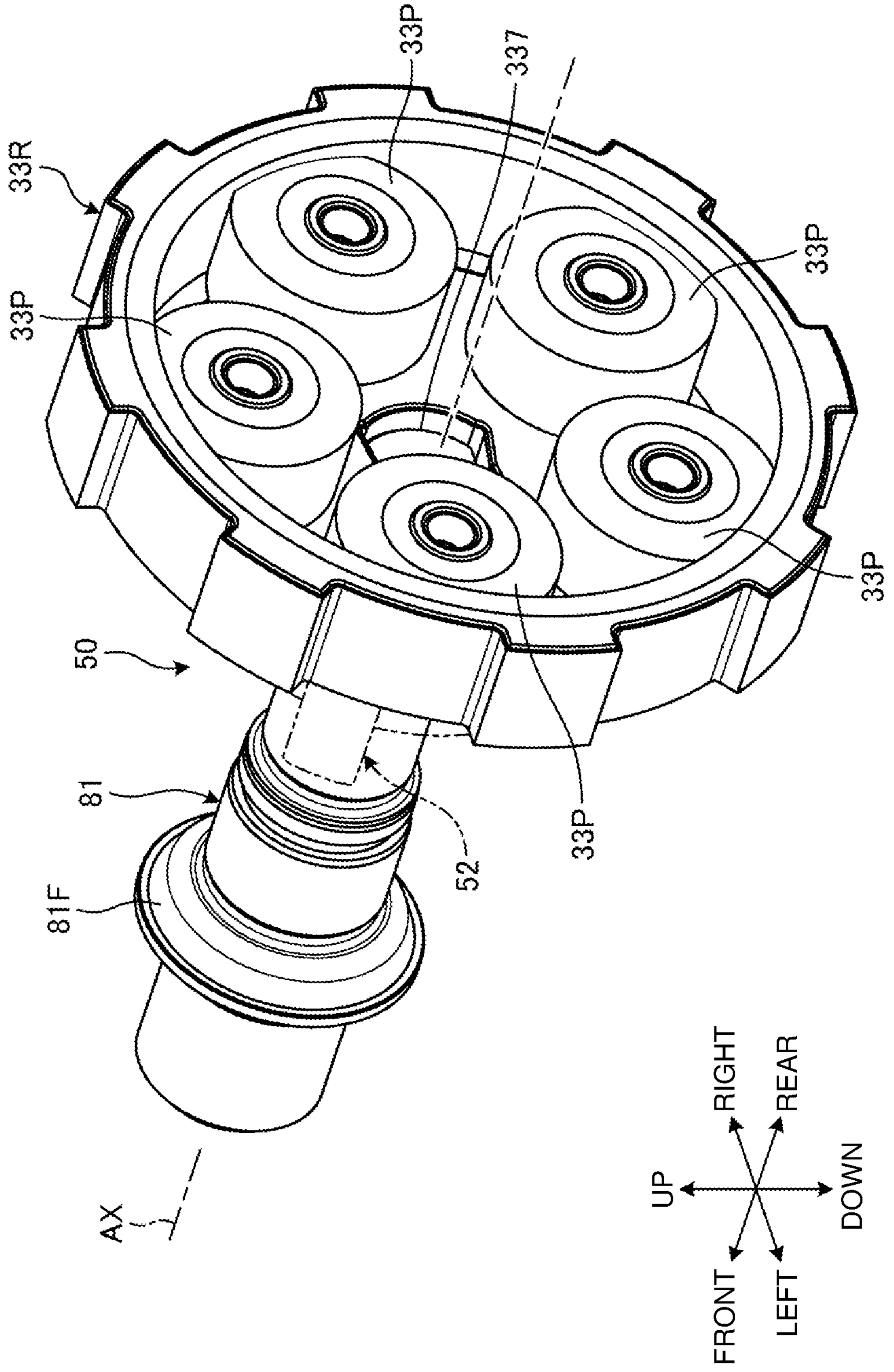
FIG. 8 is a rear perspective view of the spindle locking assembly in the embodiment.
Figure 9:
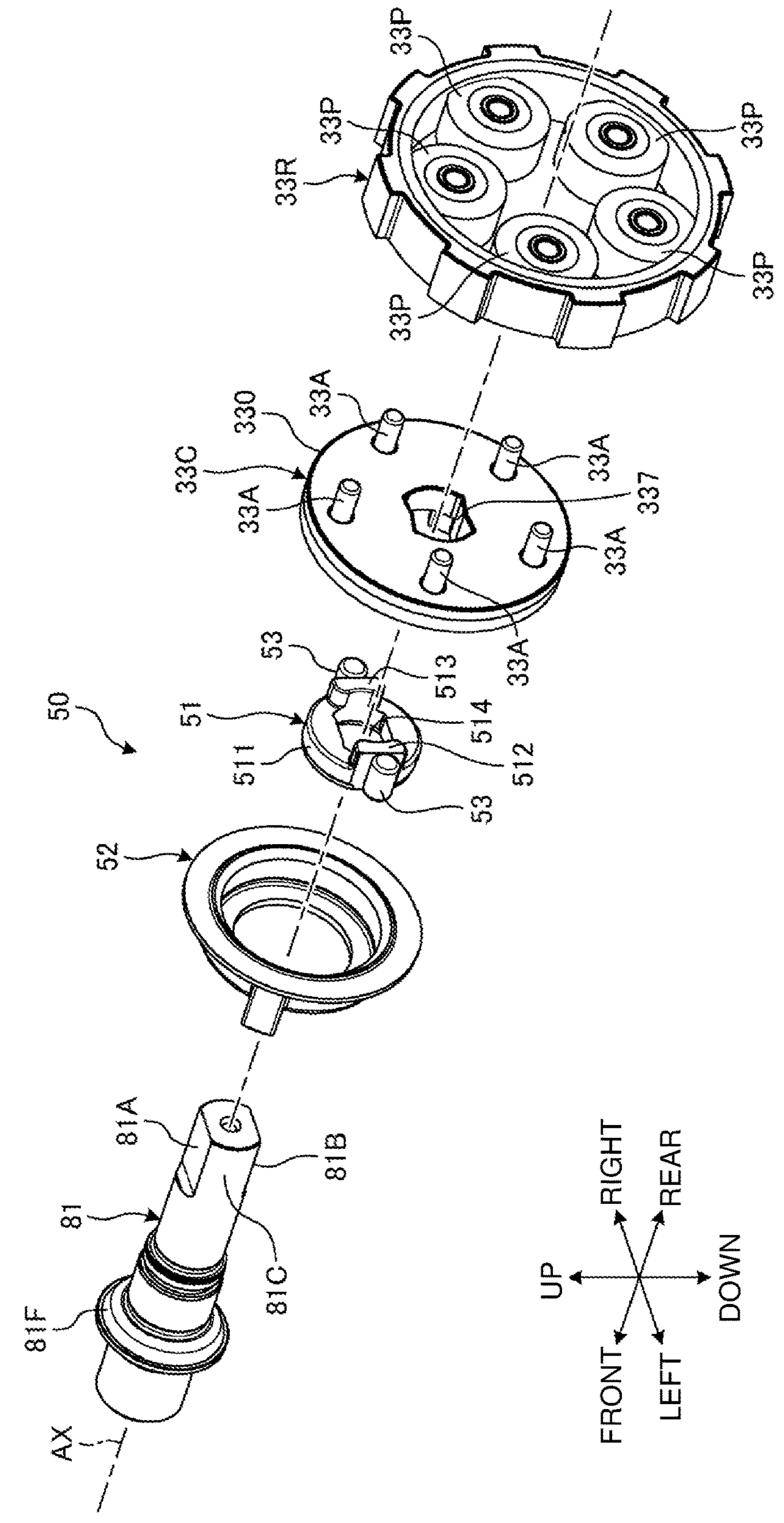
FIG. 9 is an exploded perspective view of the spindle locking assembly in the embodiment as viewed from the rear.
Figure 10:
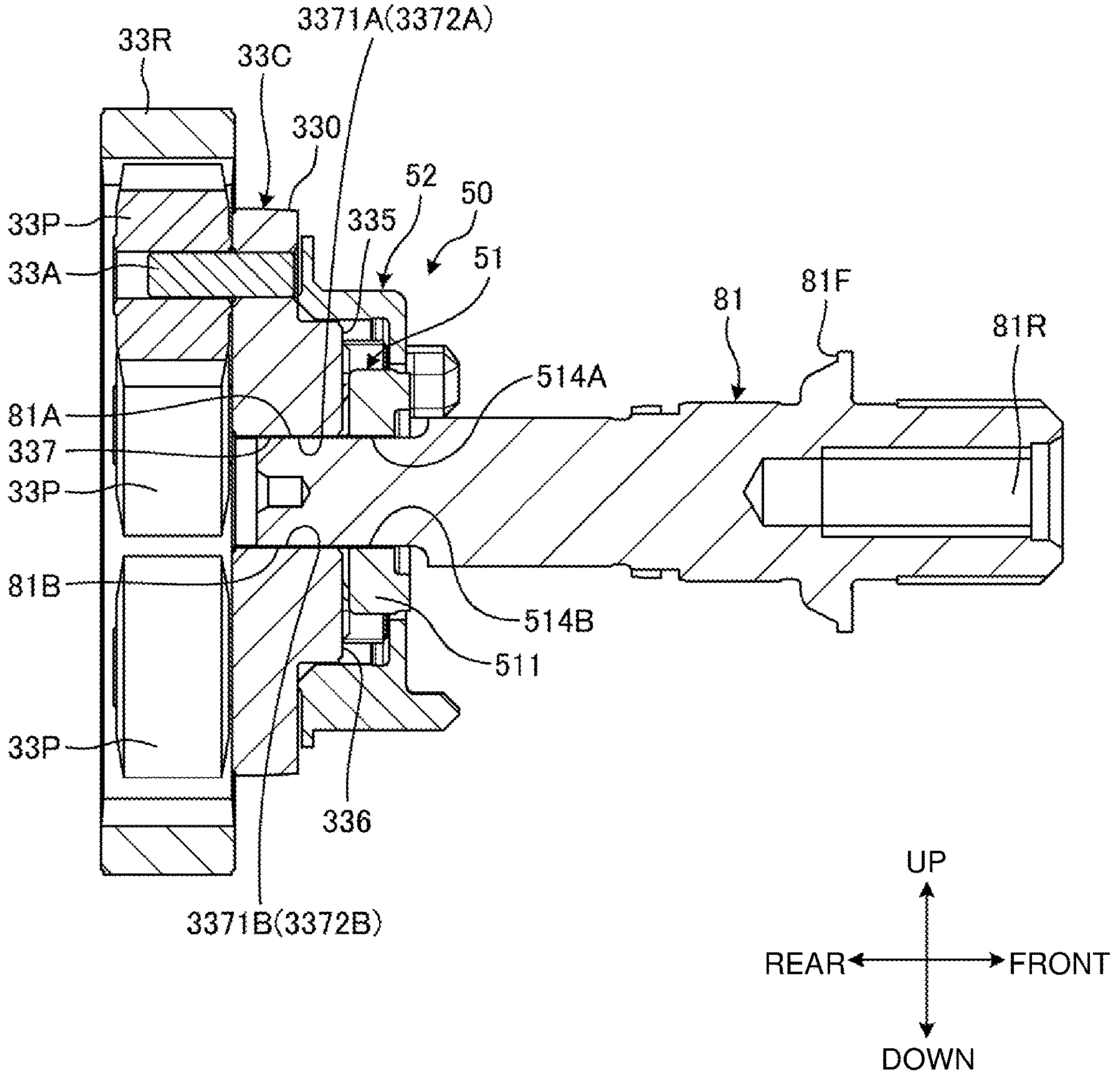
FIG. 10 is a sectional view of the spindle locking assembly in the embodiment.
Figure 11:
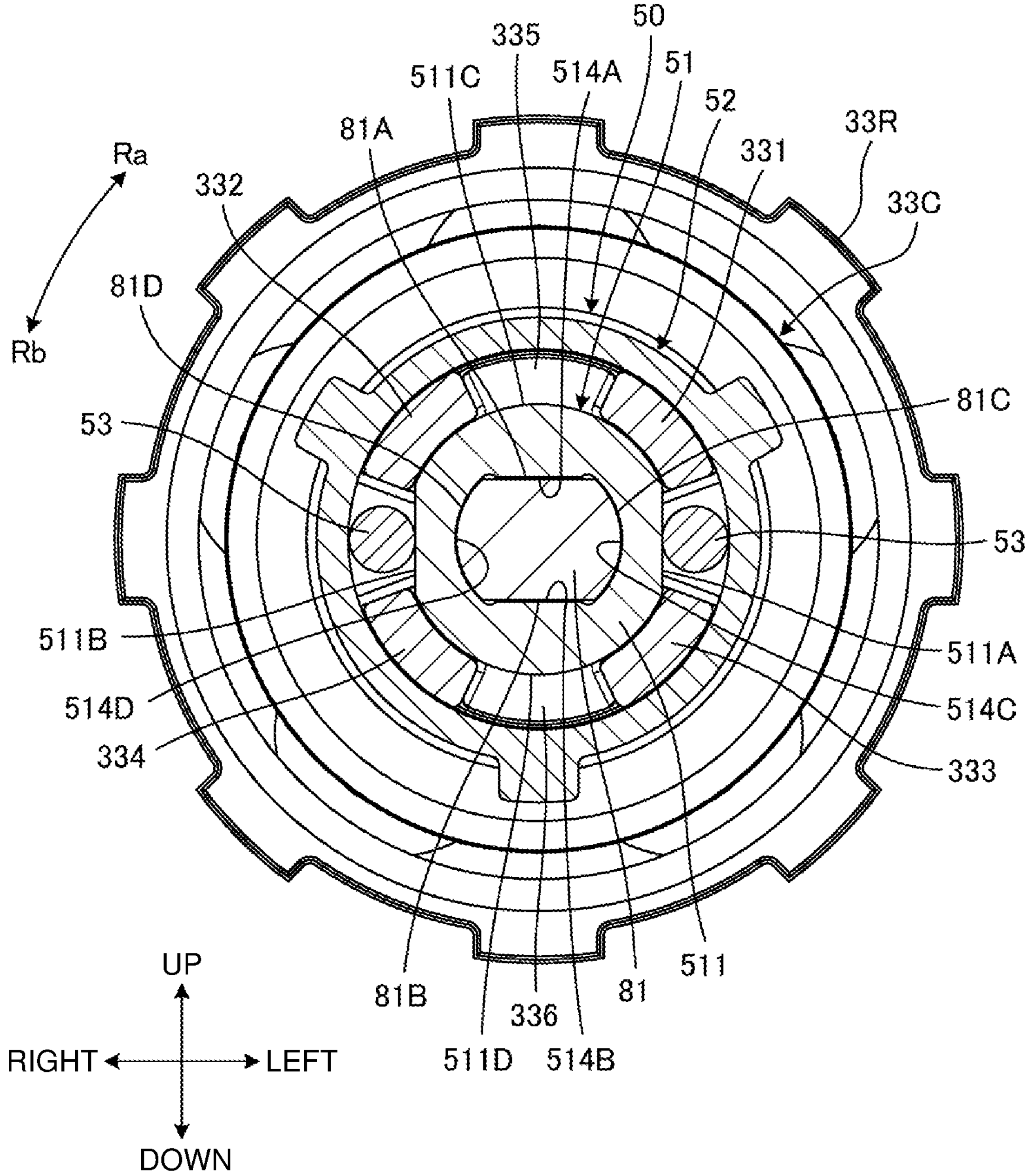
FIG. 11 is a sectional view of the spindle locking assembly in the embodiment.
Figure 12:
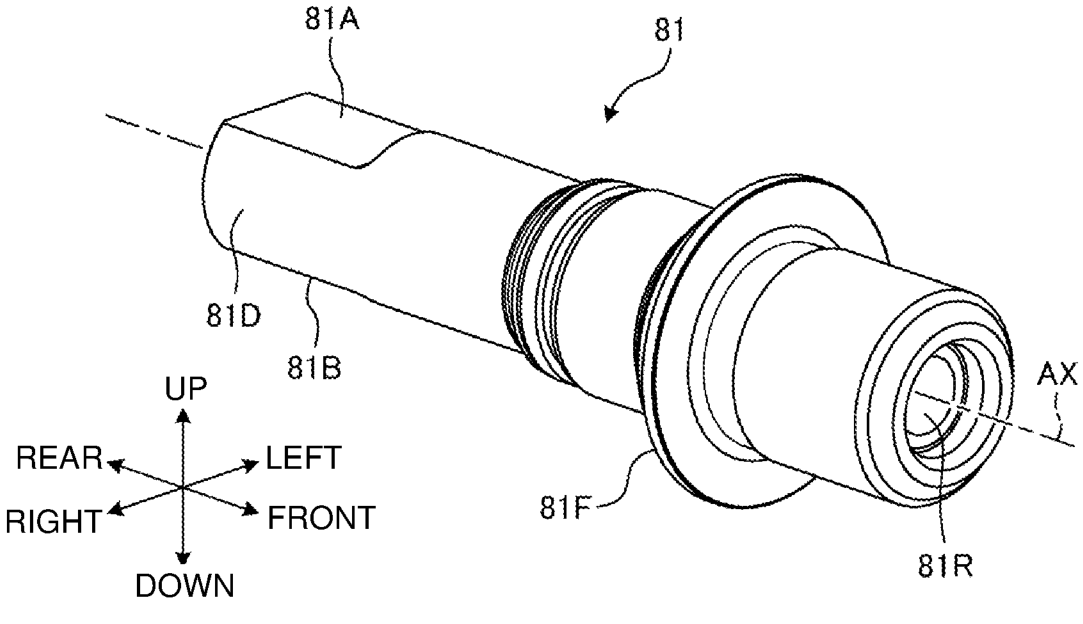
FIG. 12 is a front perspective view of the spindle in the embodiment.
Figure 13:
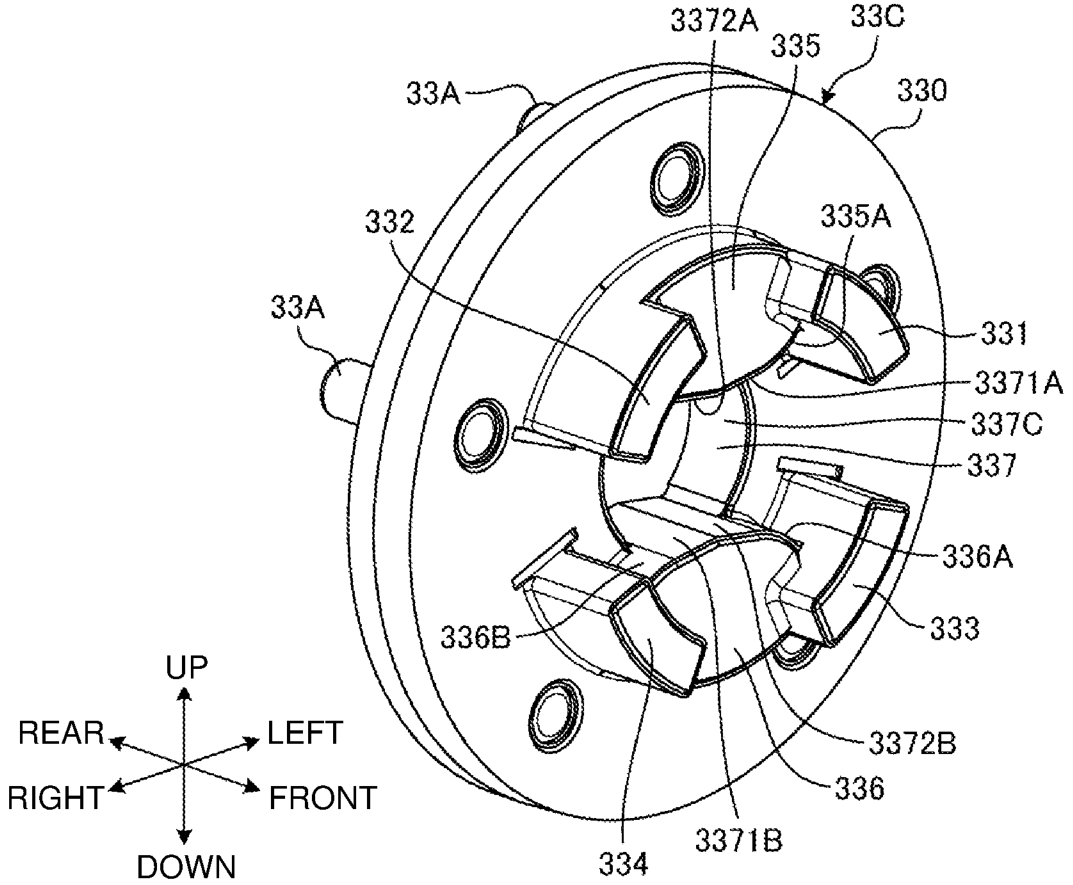
FIG. 13 is a front perspective view of a third carrier in the embodiment.
Figure 14:
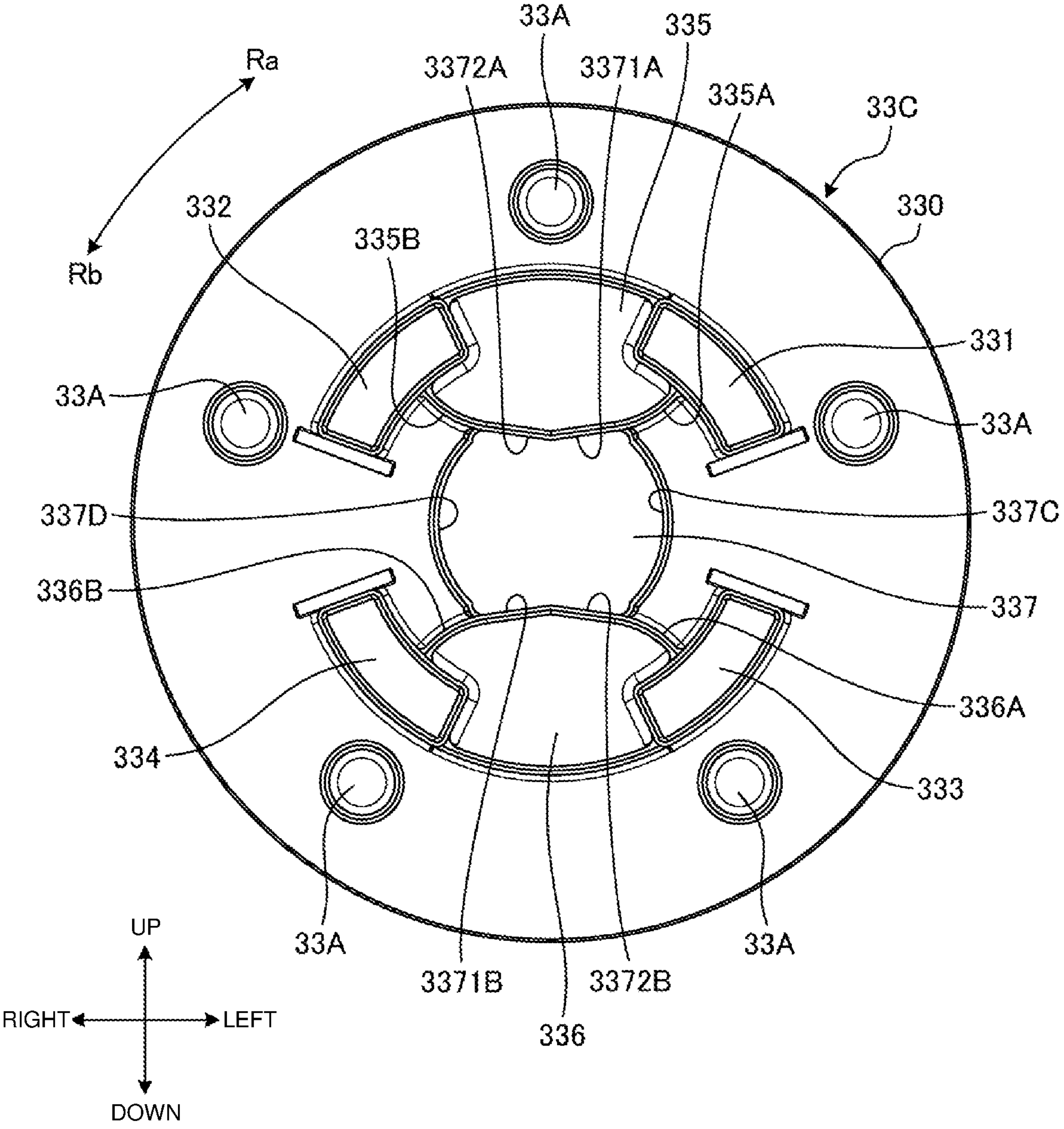
FIG. 14 is a front view of the third carrier in the embodiment.

The spindle locking assembly 50 will now be described. FIG. 6 is a front perspective view of the spindle locking assembly 50 in the embodiment. FIG. 7 is an exploded perspective view of the spindle locking assembly 50 in the embodiment as viewed from the front. FIG. 8 is a rear perspective view of the spindle locking assembly 50 in the embodiment. FIG. 9 is an exploded perspective view of the spindle locking assembly 50 in the embodiment as viewed from the rear. FIG. 10 is a sectional view of the spindle locking assembly 50 in the embodiment taken along line A-A in FIG. 6 as viewed in the direction indicated by arrows. FIG. 11 is a sectional view of the spindle locking assembly 50 in the embodiment taken along line B-B in FIG. 6 as viewed in the direction indicated by arrows. FIG. 12 is a front perspective view of the spindle 81 in the embodiment. FIG. 13 is a front perspective view of the third carrier 33C in the embodiment. FIG. 14 is a front view of the third carrier 33C in the embodiment.

The spindle locking assembly 50 transmits a rotational force from the third carrier 33C to the spindle 81 and blocks transmission of the rotational force from the spindle 81 to the third carrier 33C. The spindle locking assembly 50 functions as a one-way clutch that transmits a rotational force from the third carrier 33C to the spindle 81 in one direction alone.

The spindle locking assembly 50 is connected to each of the spindle 81 and the third carrier 33C. The spindle locking assembly 50 includes the lock cam 51, the lock ring 52, and multiple pins 53 (cylindrical members). The lock cam 51 surrounds the spindle 81. The lock ring 52 surrounds the lock cam 51. The multiple pins 53 are located between the lock cam 51 and the lock ring 52.

The spindle 81 is a rod elongated in the front-rear direction. The spindle 81 includes the flange 81F and the threaded hole 81R. The flange 81F comes in contact with the front end of the coil spring 87. The threads on the screw 88 are placed in the threaded hole 81R.

The spindle 81 includes a rear portion with a flat surface 81A, a flat surface 81B, a curved surface 81C, and a curved surface 81D on the outer surface. Each of the flat surface 81A, the flat surface 81B, the curved surface 81C, and the curved surface 81D is parallel to the rotation axis AX. The flat surface 81A and the flat surface 81B are parallel to each other. The flat surface 81A and the flat surface 81B define flat edges on the rear portion of the spindle 81 extending frontward from the rear end of the spindle 81. The curved surface 81C connects the left end of the flat surface 81A with the left end of the flat surface 81B. The curved surface 81D connects the right end of the flat surface 81A with the right end of the flat surface 81B. In the cross section orthogonal to the rotation axis AX, the curved surface 81C and the curved surface 81D are arcs being away from the rotation axis AX.

The third carrier 33C is located frontward from the internal gear 33R and the planetary gears 33P. The internal gear 33R surrounds the planetary gears 33P. The third carrier 33C supports the planetary gears 33P. The multiple pins 33A are supported on the third carrier 33C. The pins 33A protrude rearward from the rear surface of the third carrier 33C. The pins 33A support the corresponding planetary gears 33P in a rotatable manner. The third carrier 33C supports the planetary gears 33P with the corresponding pins 33A in a rotatable manner.

The third carrier 33C includes a plate 330, a protrusion 331, a protrusion 332, a protrusion 333, a protrusion 334, a land 335, and a land 336.

The plate 330 is substantially disk-shaped. The front surface of the plate 330 is parallel to the rear surface of the plate 330. The plate 330 has a hole 337 at its center. The hole 337 extends through the front surface of the plate 330 and the rear surface of the plate 330.

Each of the protrusions 331 to 334 protrudes frontward from the front surface of the plate 330. The protrusions 331 to 334 protrude by substantially equal amounts. The amount by which each of the protrusions 331 to 334 protrudes refers to the amount by which each protrusion protrudes from the front surface of the plate 330. The protrusions 331 to 334 are spaced apart from one another to surround the hole 337 (about the rotation axis AX of the third carrier 33C). The protrusion 331 is located at the upper left of the hole 337. The protrusion 332 is located at the upper right of the hole 337. The protrusion 333 is located at the lower left of the hole 337. The protrusion 334 is located at the lower right of the hole 337. In a plane orthogonal to the rotation axis AX, each of the protrusions 331 to 334 extends along the outer shape of the hole 337. The protrusions 331 to 334 are substantially arc-shaped in a plane orthogonal to the rotation axis AX.

Each of the lands 335 and 336 protrudes frontward from the front surface of the plate 330. The land 335 and the land 336 protrude by substantially equal amounts. The amount by which each of the lands 335 and 336 protrudes refers to the amount by which each land protrudes from the front surface of the plate 330. In the circumferential direction, the land 335 is located between the protrusions 331 and 332. In the circumferential direction, the land 336 is located between the protrusions 333 and 334. The land 335 protrudes by a lesser amount than each of the protrusions 331 and 332. The land 336 protrudes by a lesser amount than each of the protrusions 333 and 334. In a plane orthogonal to the rotation axis AX, each of the lands 335 and 336 extends along the outer shape of the hole 337. The lands 335 and 336 are substantially arc-shaped in a plane orthogonal to the rotation axis AX.

As shown in FIGS. 13 and 14, the third carrier 33C has a flat surface 3371A, a flat surface 3371B, a flat surface 3372A, a flat surface 3372B, a curved surface 337C, and a curved surface 337D. Each of the flat surface 3371A, the flat surface 3371B, the flat surface 3372A, the flat surface 3372B, the curved surface 337C, and the curved surface 337D is parallel to the rotation axis AX.

The flat surface 3371A includes a portion of the inner surface of the hole 337 and a portion of the inner surface of the land 335 facing the hole 337. The flat surface 3372A includes a portion of the inner surface of the hole 337 and a portion of the inner surface of the land 335 facing the hole 337.

The flat surface 3371B includes a portion of the inner surface of the hole 337 and a portion of the inner surface of the land 336 facing the hole 337. The flat surface 3372B includes a portion of the inner surface of the hole 337 and a portion of the inner surface of the land 336 facing the hole 337.

The flat surfaces 3371A and 3372A are adjacent to each other. The flat surface 3371A is located leftward from the flat surface 3372A. The angle between the flat surface 3371A and the flat surface 3372A is greater than 180°. The flat surface 3371B and the flat surface 3372B are adjacent to each other. The flat surface 3371B is located rightward from the flat surface 3372B. The angle between the flat surface 3371B and the flat surface 3372B is greater than 180°. The flat surface 3371A and the flat surface 3371B are parallel to each other. The flat surface 3372A and the flat surface 3372B are parallel to each other.

The curved surface 337C includes a portion of the inner surface of the hole 337. The inner surface of the hole 337 includes the curved surface 337C connecting the left end of the flat surface 3371A with the left end of the flat surface 3372B. The curved surface 337D includes a portion of the inner surface of the hole 337. The inner surface of the hole 337 includes the curved surface 337D connecting the right end of the flat surface 3372A with the right end of the flat surface 3371B. In the cross section orthogonal to the rotation axis AX, the curved surfaces 337C and 337D are arcs being away from the rotation axis AX.

The land 335 has a support surface 335A and a support surface 335B. The support surface 335A connects to the front surface of the plate 330 and to the inner surface of the protrusion 331 facing radially inward. The support surface 335B connects to the front surface of the plate 330 and to the inner surface of the protrusion 332 facing radially inward.

The land 336 includes a support surface 336A and a support surface 336B. The support surface 336A connects to the front surface of the plate 330 and to the inner surface of the protrusion 333 facing radially inward. The support surface 336B connects to the front surface of the plate 330 and to the inner surface of the protrusion 334 facing radially inward. Each of the support surface 335A, the support surface 335B, the support surface 336A, and the support surface 336B is parallel to the rotation axis AX.

Figure 15:
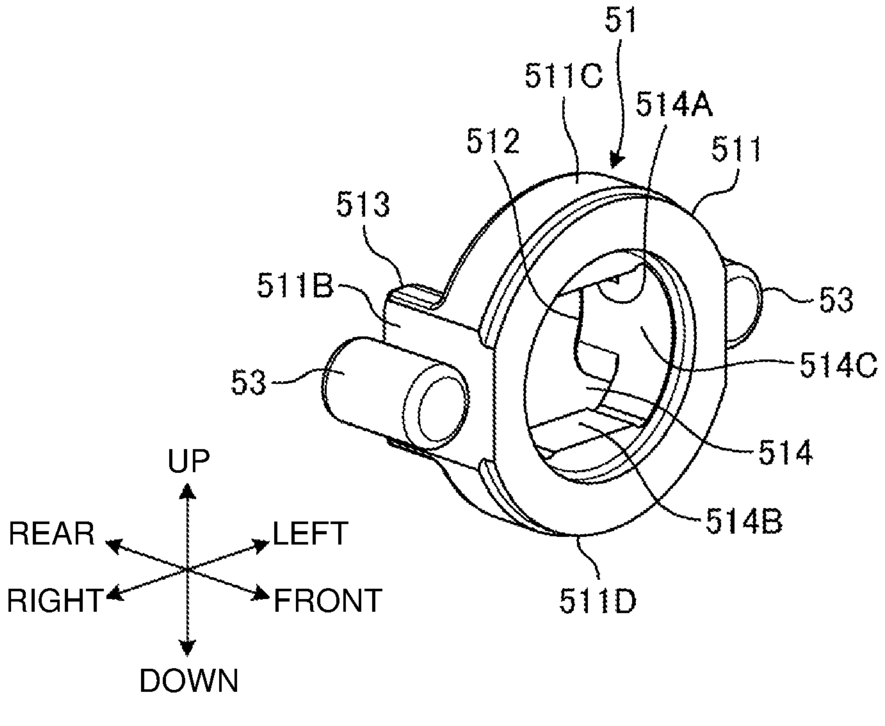
FIG. 15 is a front perspective view of a lock cam and pins in the embodiment.
Figure 16:
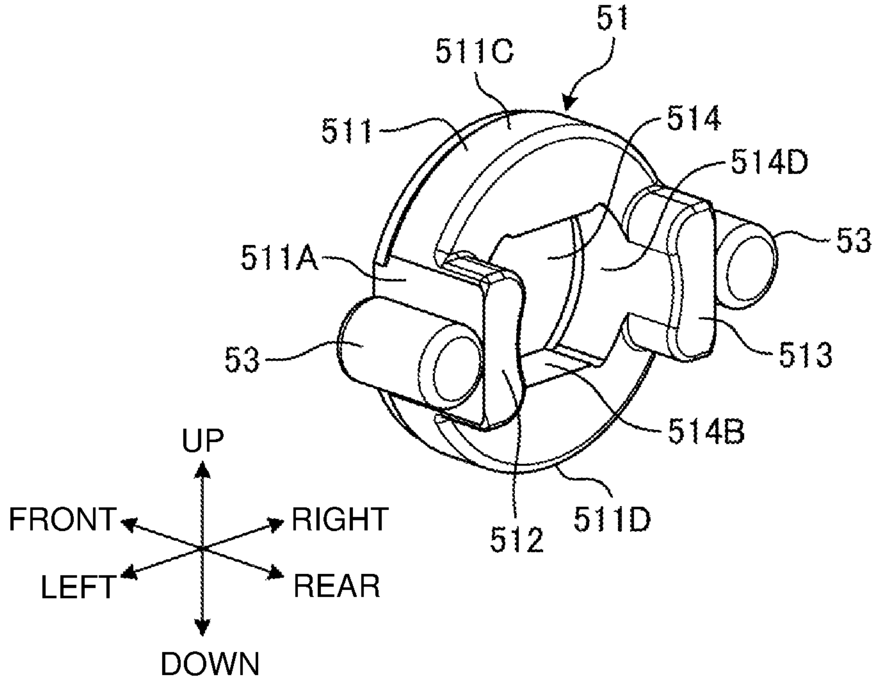
FIG. 16 is a rear perspective view of the lock cam and the pins in the embodiment.

FIG. 15 is a front perspective view of the lock cam 51 and the pins 53 in the embodiment. FIG. 16 is a rear perspective view of the lock cam 51 and the pins 53 in the embodiment.

The lock cam 51 surrounds the spindle 81 frontward from the front surface of the plate 330 in the third carrier 33C. The lock cam 51 includes a cylindrical portion 511, a protrusion 512, and a protrusion 513.

The outer surface of the lock cam 51 includes a flat surface 511A, a flat surface 511B, a curved surface 511C, and a curved surface 511D. Each of the flat surface 511A, the flat surface 511B, the curved surface 511C, and the curved surface 511D is parallel to the rotation axis AX. The flat surface 511A and the flat surface 511B are parallel to each other. The curved surface 511C connects the upper end of the flat surface 511A with the upper end of the flat surface 511B. The curved surface 511D connects the lower end of the flat surface 511A with the lower end of flat surface 511B. In the cross section orthogonal to the rotation axis AX, the curved surface 511C and the curved surface 511D are arcs being away from the rotation axis AX.

The cylindrical portion 511 surrounds the rear portion of the spindle 81. The outer surface of the cylindrical portion 511 includes a portion of the flat surface 511A, a portion of the flat surface 511B, the curved surface 511C, and the curved surface 511D. The portion of the flat surface 511A is located on the left of the cylindrical portion 511. The portion of the flat surface 511B is located on the right of the cylindrical portion 511.

The cylindrical portion 511 has a hole 514 at its center. The hole 514 extends through the front surface and the rear surface of the cylindrical portion 511. The rear portion of the spindle 81 is received in the hole 514.

The inner surface of the hole 514 includes a flat surface 514A, a flat surface 514B, a curved surface 514C, and a curved surface 514D. Each of the flat surface 514A, the flat surface 514B, the curved surface 514C, and the curved surface 514D is parallel to the rotation axis AX. The flat surface 514A and the flat surface 514B are parallel to each other. The curved surface 514C connects the left end of the flat surface 514A with the left end of the flat surface 514B. The curved surface 514D connects the right end of the flat surface 514A with the right end of the flat surface 514B. In the cross section orthogonal to the rotation axis AX, the curved surface 514C and the curved surfaces 514D are arcs being away from the rotation axis AX.

Each of the protrusions 512 and 513 protrudes rearward from the rear surface of the cylindrical portion 511. The portion of the flat surface 511A is located on the side surface of the protrusion 512. The portion of the flat surface 511B is located on the side surface of the protrusion 513. The protrusions 512 and 513 protrude by substantially equal amounts. The amount by which each of the protrusions 512 and 513 refers to the amount by which each protrusion protrudes from the rear surface of the cylindrical portion 511. The protrusion 512 is located leftward from the hole 514. The protrusion 513 is located rightward from the hole 514. Each of the protrusions 512 and 513 is located without protruding radially outward from the outer surface of the cylindrical portion 511.

The lock ring 52 supports the lock cam 51 in a rotatable manner. The lock ring 52 surrounds the lock cam 51. The lock ring 52 is fixed to the second casing 4B. The lock ring 52 does not rotate.

The multiple (two in the embodiment) pins 53 surround the lock cam 51. One pin 53 faces the flat surface 511A of the lock cam 51. The other pin 53 faces the flat surface 511B of the lock cam 51. In the front-rear direction, the flat surface 511A and the corresponding pin 53 have substantially equal dimensions. In the front-rear direction, the flat surface 511B and the corresponding pin 53 have substantially equal dimensions.

Figure 17:
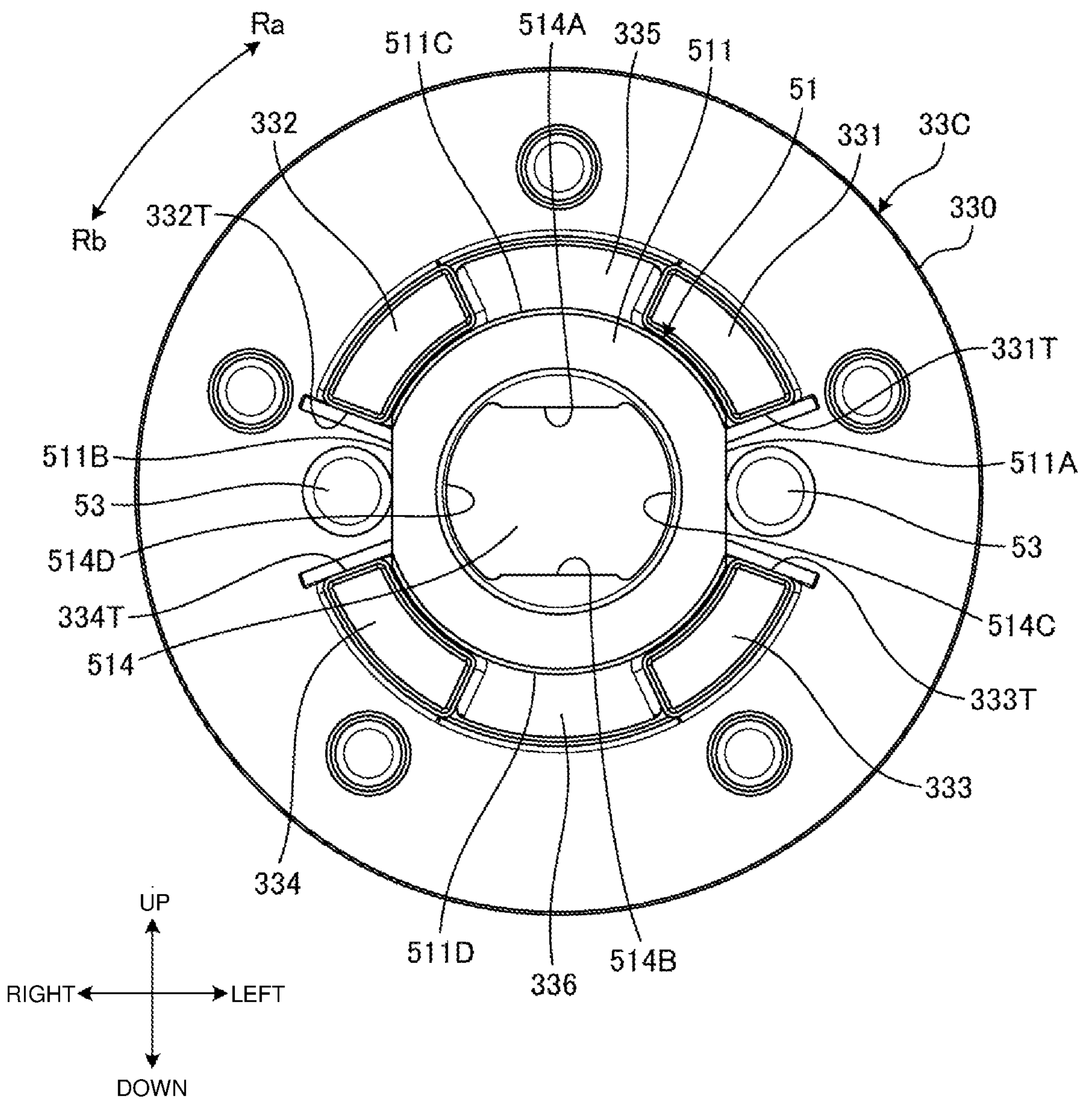
FIG. 17 is a front view of the third carrier, the lock cam, and the pins in the embodiment, describing the positional relationship between them.

FIG. 17 is a front view of the third carrier 33C, the lock cam 51, and the pins 53 in the embodiment, describing the positional relationship between them.

As shown in FIGS. 11 and 17, the lock cam 51 is located radially inward from the multiple protrusions 331, 332, 333, and 334. As shown in FIG. 11, the lock ring 52 is at least partially located radially outward from the multiple protrusions 331, 332, 333, and 334.

The pins 53 are located between the outer surface of the lock cam 51 and the inner surface of the lock ring 52. The pins 53 are located between the lock cam 51 and the lock ring 52 to allow the central axis of each pin 53 to be parallel to the rotation axis AX of the spindle 81.

The pin 53 facing the flat surface 511A is located between a lower end face 331T of the protrusion 331 and an upper end face 333T of the protrusion 333 in the circumferential direction. The pin 53 facing the flat surface 511B is located between a lower end face 332T of the protrusion 332 and an upper end face 334T of the protrusion 334 in the circumferential direction.

The cylindrical portion 511 of the lock cam 51 is located radially inward from the protrusions 331 to 334 and the lands 335 and 336. The rear surface of the cylindrical portion 511 faces the front surfaces of the lands 335 and 336.

The protrusion 512 is located between the support surface 335A of the land 335 and the support surface 336A of the land 336. The rear surface of the protrusion 512 faces the front surface of the cylindrical portion 511 leftward from the hole 337. The protrusion 513 is located between the support surface 335B of the land 335 and the support surface 336B of the land 336. The rear surface of the protrusion 513 faces the front surface of the cylindrical portion 511 rightward from the hole 337.

As shown in FIG. 11, one pin 53 is located between the flat surface 511A of the lock cam 51 and the inner surface of the lock ring 52. The other pin 53 is located between the flat surface 511B of the lock cam 51 and the inner surface of the lock ring 52.

The rear portion of the spindle 81 is received in the hole 337 in the third carrier 33C. The flat surface 81A of the spindle 81 comes in contact with one of the flat surfaces 3371A and 3372A. The flat surface 81B of the spindle 81 comes in contact with one of the flat surfaces 3371B and 3372B. The curved surface 81C of the spindle 81 faces the curved surface 337C. The curved surface 81D of the spindle 81 faces the curved surface 337D.

When the flat surface 81A of the spindle 81 comes in contact with the flat surface 3371A, the flat surface 81B of the spindle 81 comes in contact with the flat surface 3371B. In this case, the flat surface 81A is separate from the flat surface 3372A, and the flat surface 81B is separate from the flat surface 3372B.

When the flat surface 81A of the spindle 81 comes in contact with the flat surface 3372A, the flat surface 81B of the spindle 81 comes in contact with the flat surface 3372B. In this case, the flat surface 81A is separate from the flat surface 3371A, and the flat surface 81B is separate from the flat surface 3371B.

In the example described below, the state in which the flat surface 81A is in contact with the flat surface 3371A and the flat surface 81B of the spindle 81 is in contact with the flat surface 3371B is referred to as a first contact state. The state in which the flat surface 81A is in contact with the flat surface 3372A and the flat surface 81B is in contact with the flat surface 3372B is referred to as a second contact state.

In the embodiment, the spindle 81 and the third carrier 33C can rotate slightly relative to each other to change between the first contact state and the second contact state.

The rear portion of the spindle 81 is received in the hole 514 in the lock cam 51. The flat surface 81A of the spindle 81 faces the flat surface 514A. The flat surface 81B of the spindle 81 faces the flat surface 514B. The curved surface 81C of the spindle 81 faces the curved surface 514C. The curved surface 81D of the spindle 81 faces the curved surface 514D. The lock cam 51 is rotatable together with the spindle 81.

When the third carrier 33C rotates in the direction indicated by arrow Ra shown in FIGS. 11, 14, and 17 as driven by the motor 6, the spindle 81 rotates together with the third carrier 33C in the direction indicated by arrow Ra in the first contact state in which the flat surface 81A is in contact with the flat surface 3371A and the flat surface 81B of the spindle 81 is in contact with the flat surface 3371B. The lock cam 51 rotates together with the spindle 81 in the direction indicated by arrow Ra. The pin 53 facing the flat surface 511A rotates together with the third carrier 33C in contact with the lower end face 331T of the protrusion 331. The pin 53 facing the flat surface 511B rotates together with the third carrier 33C in contact with the upper end face 334T of the protrusion 334.

When the third carrier 33C rotates in the direction indicated by arrow Rb shown in FIGS. 11, 14, and 17 as driven by the motor 6, the spindle 81 rotates together with the third carrier 33C in the direction indicated by arrow Rb in the second state in which the flat surface 81A is in contact with the flat surface 3372A and the flat surface 81B of the spindle 81 is in contact with the flat surface 3372B. The lock cam 51 rotates together with the spindle 81 in the direction indicated by arrow Rb. The pin 53 facing the flat surface 511A rotates together with the third carrier 33C in contact with the upper end face 333T of the protrusion 333. The pin 53 facing the flat surface 511B rotates together with the third carrier 33C in contact with the lower end face 332T of the protrusion 332.

Thus, when the third carrier 33C rotates as driven by the motor 6, the rotational force from the third carrier 33C is transmitted to the spindle 81. The third carrier 33C and the spindle 81 rotate together, with the relative positions of the lock cam 51 and the pin 53 in the circumferential direction being unchanged.

When, for example, attaching a tip tool to the output unit 8, the operator may apply a force in the rotation direction to the spindle 81. For example, the spindle 81 may rotate when the chuck 82 is tightened. To attach the tip tool smoothly to the output unit 8, the rotation of the spindle 81 is to be restricted. In attaching the tip tool, the spindle locking assembly 50 blocks transmission of a rotational force from the spindle 81 to the third carrier 33C. In other words, the rotation of the spindle 81 is restricted. This allows the tip tool to be smoothly attached to the output unit 8.

When a force is applied in the rotation direction to the spindle 81 and the spindle 81 is about to rotate, the lock cam 51 is also about to rotate together with the spindle 81. The lock ring 52 surrounds the lock cam 51. The lock ring 52 is fixed to the casing 4 and does not rotate. As the lock cam 51 rotates, the pin 53 facing the flat surface 511A moves and is pushed radially outward by the flat surface 511A. The pin 53 facing the flat surface 511B then moves and is pushed radially outward by the flat surface 511B. The one pin 53 is sandwiched between the flat surface 511A and the inner surface of the lock ring 52. The other pin 53 is sandwiched between the flat surface 511B and the inner surface of the lock ring 52. The pins 53 serve as wedges that restrict rotation of the lock cam 51. This restricts the rotation of the lock cam 51, thus restricting the rotation of the spindle 81. Transmission of a rotational force from the spindle 81 to the third carrier 33C is blocked.

As described above, the spindle 81 and the third carrier 33C can rotate slightly relative to each other to change between the first contact state and the second contact state. When the spindle 81 and the third carrier 33C cannot rotate relative to each other, the lock cam 51 may not rotate until the wedge effect of the pins 53 is produced. In the embodiment, the spindle 81 and the third carrier 33C can rotate slightly relative to each other, and thus the lock cam 51 can rotate until the wedge effect of the pins 53 is produced.

The driver drill 1 according to the embodiment includes the motor 6, the third planetary gear assembly 33, the spindle 81, and the spindle locking assembly 50. The third planetary gear assembly 33 is at least partially located frontward from the motor 6. The third planetary gear assembly 33 is rotatable with a rotational force from the motor 6. The spindle 81 is at least partially located frontward from the third planetary gear assembly 33. The spindle locking assembly 50 transmits a rotational force in one direction from the third carrier 33C of the third planetary gear assembly 33 to the spindle 81. The rear portion of the spindle 81 is received in the hole 337 in the third carrier 33C.

The rear portion the spindle 81 has the outer surface including the two flat surfaces 81A and 81B. The inner surface of the hole 337 of the third carrier 33C includes the two flat surfaces 3371A and 3371B (3372A and 3372B) that come in contact with the two flat surfaces 81A and 81B of the spindle 81. The spindle locking assembly 50 includes the lock cam 51 surrounding the spindle 81 frontward from the front surface of the plate 330 in the third carrier 33C and rotatable together with the spindle 81. The spindle locking assembly 50 includes the lock ring 52 surrounding the lock cam 51. The spindle locking assembly 50 includes the two pins 53 (cylindrical members) between the lock cam 51 and the lock ring 52.

In the above structure, the inner surface of the hole 337 in the third carrier 33C includes the two flat surfaces 3371A and 3371B (3372A and 3372B) that come in contact with the two flat surfaces 81A and 81B of the spindle, allowing a rotational force from the third carrier 33C to be directly transmitted to the spindle 81. The inner surface and the flat surfaces 3371A and 3371B (3372A and 3372B) of the hole 337 in the third carrier 33C and the flat surfaces 81A and 81B of the outer surface of the spindle 81 in contact with each other can reduce the concentration of stress in the third carrier 33C and the spindle 81. Thus, damage to the third carrier 33C and the spindle 81 is reduced. The spindle locking assembly 50 transmits a rotational force from the third carrier 33C to the spindle 81 and blocks transmission of the rotational force from the spindle 81 to the third carrier 33C.

The outer surface of the lock cam 51 includes the first flat surface 511A and the second flat surface 511B in the embodiment. The pins 53 include a first pin 53 between the flat surface 511A of the lock cam 51 and the inner surface of the lock ring 52 and a second pin 53 between the flat surface 511B of the lock cam 51 and the inner surface of the lock ring 52.

In the above structure, when a force is applied in the rotation direction to the spindle 81 and the spindle 81 is about to rotate, the lock cam 51 is also about to rotate together with the spindle 81. The lock ring 52 surrounds the lock cam 51. The lock ring 52 does not rotate. As the lock cam 51 rotates, the first pin 53 moves and is pushed radially outward by the flat surface 511A, and the second pin 53 moves and is pushed radially outward by the flat surface 511B. The first pin 53 is sandwiched between the flat surface 511A and the inner surface of the lock ring 52. The second pin 53 is sandwiched between the flat surface 511B and the inner surface of the lock ring 52. The first and second pins 53 serve as wedges that restrict rotation of the lock cam 51. This restricts the rotation of the lock cam 51, thus restricting the rotation of the spindle 81. This blocks transmission of a rotational force from the spindle 81 to the third carrier 33C.

In the embodiment, the flat surface 511A and the first pin 53 have substantially equal dimensions, and the flat surface 511B and the second pin 53 have substantially equal dimensions in the front-rear direction parallel to the rotation axis AX of the spindle 81.

In the above structure, the first pin 53 is located appropriately between the flat surface 511A and the inner surface of the lock ring 52. Similarly, the second pin 53 is located appropriately between the flat surface 511B and the inner surface of the lock ring 52.

In the embodiment, the inner surface of the hole 337 in the third carrier 33C includes a first pair of two flat surfaces 3371A and 3371B and a second pair of two flat surfaces 3372A and 3372B. The spindle 81 and the third carrier 33C are rotatable relative to each other to change between a first contact state and a second contact state. In the first contact state, the two flat surfaces 81A and 81B of the spindle 81 are in contact with the first pair of two flat surfaces 3371A and 3371B and are not in contact with the second pair of two flat surfaces 3372A and 3372B. In the second contact state, the two flat surfaces 81A and 81B of the spindle 81 are in contact with the second pair of two flat surfaces 3372A and 3372B and are not in contact with the first pair of two flat surfaces 3371A and 3371B.

In the above structure, when a force is applied in the rotation direction to the spindle 81, the lock cam 51 rotates until the wedge effect of each of the first and second pins 53 is produced. When the spindle 81 and the third carrier 33C cannot rotate relative to each other, the lock cam 51 may not rotate until the wedge effect of each of the first and second pins 53 is produced. The spindle 81 and the third carrier 33C can rotate slightly relative to each other, and thus the lock cam 51 can rotate until the wedge effect of the first and second pins 53 is produced.

In the embodiment, the third carrier 33C includes the protrusions 331 to 334 spaced about the rotation axis AX of the third carrier 33C and protruding frontward from the front surface of the third carrier 33C. The lock cam 51 is located radially inward from the protrusions 331 to 334. The first pin 53 is located between the protrusions 331 and 333. The second pin 53 is located between the protrusions 332 and 334.

In the above structure, the lock cam 51 is located radially inward from the multiple protrusions 331 to 334 without any excess torque being applied to the lock cam 51. This reduces the concentration of stress in the lock cam 51 and thus damage to the lock cam 51. The first pin 53 is located between the pair of protrusions 331 and 333. The second pin 53 is located between the pair of protrusions 332 and 334. Thus, when the third carrier 33C rotates with a rotational force from the motor 6, the pins 53 rotate together with the third carrier 33C. In other words, the pins 53 rotate (revolve) about the rotation axis AX as the third carrier 33C rotates. This transmits a rotational force from the third carrier 33C to the spindle 81.

Other Embodiments

In the embodiment described above, the outer surface of the rear portion of the spindle 81 includes the two flat surfaces 81A and 81B, and the inner surface of the hole 337 in the third carrier 33C includes the two flat surfaces 3371A and 3371B (3372A and 3372B) that come in contact with the two flat surfaces 81A and 81B of the spindle 81. The outer surface of the rear portion of the spindle 81 may include three or more flat surfaces, and the inner surface of the hole 337 in third carrier 33C may include three or more flat surfaces that come in contact with the three or more flat surfaces of the spindle 81.

In the embodiment described above, the spindle locking assembly 50 includes the two pins 53 (cylindrical members) between the lock cam 51 and the lock ring 52. The spindle locking assembly 50 may include three or more pins 53 (cylindrical members) between the lock cam 51 and the lock ring 52.

In the above embodiment, the driver drill 1 is powered by the battery pack 20 attached to the battery mount 5. The driver drill 1 may use utility power (alternating current power supply).

The electric work machine in the above embodiment is a driver drill (vibration driver drill), which is an example of a power tool. The power tool is not limited to a driver drill. Examples of the power tool include an impact driver, an angle drill, a screwdriver, a hammer, a hammer drill, a circular saw, and a reciprocating saw.

REFERENCE SIGNS LIST

1 driver drill
2 housing
2L left housing
2R right housing
2S screw
3 rear cover
3S screw
4 casing
4A first casing
4B second casing
4C bracket plate
4D stop plate
4E screw
4F screw
4S screw
5 battery mount
6 motor
7 power transmission
8 output unit
9 fan
10 trigger lever
11 forward-reverse switch lever
12 speed switch lever
13 mode switch ring
14 lamp
15 interface panel
16 dial
17 controller
18 inlet
19 outlet
20 battery pack
21 motor compartment
22 grip
23 battery holder
24 operation unit
25 display
26 controller case
27 panel opening
28 dial opening
30 reducer
31 first planetary gear assembly
31A pin
31C first carrier
31S pinion gear
32 second planetary gear assembly
32A pin
32C second carrier
32P planetary gear
32R internal gear
32S sun gear
33 third planetary gear assembly
33A pin
33C third carrier
33P planetary gear
33R internal gear
33S sun gear
34 first speed switcher
35 second speed switcher
36 cam ring
40 vibrator
41 first cam
42 second cam

43 vibration switch ring
43S opposing portion
43T protrusion
44 stop ring
45 support ring
46 steel ball
47 washer
48 cam ring
50 spindle locking assembly
51 lock cam
52 lock ring
53 pin (cylindrical member)
61 stator
61A stator core
61B front insulator
61C rear insulator
61D coil
61E sensor circuit board
61F short-circuiting member
62 rotor
62A rotor core
62B permanent magnet
63 rotor shaft
64 bearing
65 bearing
81 spindle
81A flat surface
81B flat surface
81C curved surface
81D curved surface
81F flange
81R threaded hole
82 chuck
83 bearing
84 bearing
87 coil spring
88 screw
311P planetary gear
312P planetary gear
311R internal gear
312R internal gear
311S larger-diameter portion
3125 smaller-diameter portion
330 plate
331 protrusion
331T lower end face
332 protrusion
332T lower end face
333 protrusion
333T upper end face
334 protrusion
334T upper end face
335 land
335A support surface
335B support surface
336 land
336A support surface
336B support surface
337 hole
3372A flat surface
3372B flat surface
337C curved surface
337D curved surface
511 cylindrical portion
511A flat surface
511B flat surface
511C curved surface
511D curved surface
512 protrusion
513 protrusion
514 hole
514A flat surface
514B flat surface
514C curved surface
514D curved surface
3371A flat surface
3371B flat surface
AX rotation axis

What is claimed is:

1. An electric work machine, comprising:
a motor;
a planetary gear assembly at least partially located frontward from the motor, rotatable with a rotational force from the motor, and including a carrier, the carrier having a hole having an inner surface including two carrier flat surfaces;
a spindle at least partially located frontward from the planetary gear assembly and including a rear portion received in the hole, the rear portion having an outer surface including two spindle flat surfaces, each of the two spindle flat surfaces being configured to come in contact with a corresponding carrier flat surface of the two carrier flat surfaces; and
a spindle locking assembly configured to transmit a rotational force in one direction from the carrier to the spindle, the spindle locking assembly including
a lock cam surrounding the spindle frontward from a front surface of the carrier and rotatable together with the spindle,
a lock ring surrounding the lock cam, and
a plurality of cylindrical members between the lock cam and the lock ring,
wherein
the lock cam has an outer surface including a first flat surface and a second flat surface, the first flat surface and the second flat surface facing radially outward, and
the cylindrical members include
a first cylindrical member between the first flat surface and an inner surface of the lock ring, and
a second cylindrical member between the second flat surface and the inner surface of the lock ring.

2. An electric work machine, comprising:
a motor;
a planetary gear assembly at least partially located frontward from the motor, rotatable with a rotational force from the motor, and including a carrier, the carrier having a hole having an inner surface including a plurality of carrier flat surfaces;
a spindle at least partially located frontward from the planetary gear assembly and including a rear portion received in the hole, the rear portion having an outer surface including a plurality of spindle flat surfaces, each of the plurality of spindle flat surfaces being configured to come in contact with a corresponding carrier flat surface of the plurality of carrier flat surfaces; and
a spindle locking assembly configured to transmit a rotational force in one direction from the carrier to the spindle, the spindle locking assembly including
a lock cam surrounding the spindle frontward from a front surface of the carrier and rotatable together with the spindle,
a lock ring surrounding the lock cam, and two cylindrical members between the lock cam and the lock ring, wherein the lock cam has an outer surface including a first flat surface and a second flat surface, the first flat surface and the second flat surface facing radially outward, and the cylindrical members include a first cylindrical member between the first flat surface and an inner surface of the lock ring, and a second cylindrical member between the second flat surface and the inner surface of the lock ring.

3. The electric work machine according to claim 1, wherein the first flat surface and the first cylindrical member have an equal dimension in a direction parallel to a rotation axis of the spindle, and the second flat surface and the second cylindrical member have an equal dimension in the direction parallel to the rotation axis of the spindle.

4. The electric work machine according to claim 1, wherein the inner surface of the hole in the carrier includes a first pair of two flat surfaces, and a second pair of two flat surfaces, and the spindle and the carrier are rotatable relative to each other to change between a first contact state and a second contact state, the first contact state is a state in which the two spindle flat surfaces are in contact with the first pair of two flat surfaces and are not in contact with the second pair of two flat surfaces, and the second contact state is a state in which the two spindle flat surfaces are in contact with the second pair of two flat surfaces and are not in contact with the first pair of two flat surfaces.

5. The electric work machine according to claim 1, wherein the carrier includes a plurality of protrusions spaced about a rotation axis of the carrier and protruding frontward from the front surface of the carrier, the lock cam is located radially inward from the plurality of protrusions, and each of the cylindrical members is between a corresponding pair of protrusions of the plurality of protrusions.

6. The electric work machine according to claim 2, wherein the first flat surface and the first cylindrical member have an equal dimension in a direction parallel to a rotation axis of the spindle, and the second flat surface and the second cylindrical member have an equal dimension in the direction parallel to the rotation axis of the spindle.

7. The electric work machine according to claim 3, wherein the inner surface of the hole in the carrier includes a first pair of two flat surfaces, and a second pair of two flat surfaces, and the spindle and the carrier are rotatable relative to each other to change between a first contact state and a second contact state, the first contact state is a state in which the two spindle flat surfaces are in contact with the first pair of two flat surfaces and are not in contact with the second pair of two flat surfaces, and the second contact state is a state in which the two spindle flat surfaces are in contact with the second pair of two flat surfaces and are not in contact with the first pair of two flat surfaces.

8. The electric work machine according to claim 2, wherein the carrier includes a plurality of protrusions spaced about a rotation axis of the carrier and protruding frontward from the front surface of the carrier, the lock cam is located radially inward from the plurality of protrusions, and each of the cylindrical members is between a corresponding pair of protrusions of the plurality of protrusions.

9. The electric work machine according to claim 3, wherein the carrier includes a plurality of protrusions spaced about a rotation axis of the carrier and protruding frontward from the front surface of the carrier, the lock cam is located radially inward from the plurality of protrusions, and each of the cylindrical members is between a corresponding pair of protrusions of the plurality of protrusions.

10. The electric work machine according to claim 4, wherein the carrier includes a plurality of protrusions spaced about a rotation axis of the carrier and protruding frontward from the front surface of the carrier, the lock cam is located radially inward from the plurality of protrusions, and each of the cylindrical members is between a corresponding pair of protrusions of the plurality of protrusions.

11. An electric work machine, comprising:

a motor;

a planetary gear assembly at least partially located frontward from the motor, rotatable with a rotational force from the motor, and including a carrier, the carrier having a hole having an inner surface including two carrier flat surfaces;

a spindle at least partially located frontward from the planetary gear assembly and including a rear portion received in the hole, the rear portion having an outer surface including two spindle flat surfaces, each of the two spindle flat surfaces being configured to come in contact with a corresponding carrier flat surface of the two carrier flat surfaces; and a spindle locking assembly configured to transmit a rotational force in one direction from the carrier to the spindle, the spindle locking assembly including a lock cam surrounding the spindle frontward from a front surface of the carrier and rotatable together with the spindle, a lock ring surrounding the lock cam, and a plurality of cylindrical members between the lock cam and the lock ring, wherein the carrier includes a plurality of protrusions spaced about a rotation axis of the carrier and protruding frontward from the front surface of the carrier, the lock cam is located radially inward from the plurality of protrusions, each of the cylindrical members is between a corresponding pair of protrusions of the plurality of protrusions in a circumferential direction, with the cylindrical member and the pair of protrusions being equally distanced radially from the rotation axis.

12. The electric work machine according to claim 11, wherein the cylindrical members move in both directions such that each of the cylindrical members are in contact with both of the corresponding pair of protrusions depending on a rotational direction.

13. The electric work machine according to claim 1, wherein the carrier includes a plurality of pins that support the planetary gear assembly in a rotatable manner, and the cylindrical members are located radially inward from the pins.

14. The electric work machine according to claim 2, wherein the carrier includes a plurality of pins that support the planetary gear assembly in a rotatable manner, and the cylindrical members are located radially inward from the pins.

15. The electric work machine according to claim 1, wherein the lock cam has a hole at a center, the hole includes a first hole surface and a second hole surface, and the cylindrical member has a longer axial length than the first hole surface and the second hole surface.

16. The electric work machine according to claim 2, wherein the lock cam has a hole at a center, the hole includes a first hole flat surface and a second hole flat surface, and the cylindrical member has a longer axial length than the first hole flat surface and the second hole flat surface.

17. The electric work machine according to claim 11, wherein at least a portion of each of the cylindrical members overlaps with the corresponding pair of protrusions when viewed in a direction perpendicular to the rotation axis.

* * * * *